(12) United States Patent
Gao et al.

(10) Patent No.: US 11,412,532 B2
(45) Date of Patent: Aug. 9, 2022

(54) METHOD AND DEVICE FOR DETERMINING WHETHER DATA IS DAMAGED

(71) Applicant: CHINA ACADEMY OF TELECOMMUNICATIONS TECHNOLOGY, Beijing (CN)

(72) Inventors: Xuejuan Gao, Beijing (CN);
Ekpenyong Tony, Beijing (CN);
Fang-Chen Cheng, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 6 days.

(21) Appl. No.: 16/611,204

(22) PCT Filed: Mar. 14, 2018

(86) PCT No.: PCT/CN2018/079029
§ 371 (c)(1),
(2) Date: Nov. 5, 2019

(87) PCT Pub. No.: WO2018/201807
PCT Pub. Date: Nov. 8, 2018

(65) Prior Publication Data
US 2020/0146036 A1 May 7, 2020

(30) Foreign Application Priority Data
May 5, 2017 (CN) .......................... 201710314194.6

(51) Int. Cl.
*H04W 4/00* (2018.01)
*H04W 72/12* (2009.01)
(Continued)

(52) U.S. Cl.
CPC ....... *H04W 72/1273* (2013.01); *H04L 1/1819* (2013.01); *H04L 5/0055* (2013.01);
(Continued)

(58) Field of Classification Search
CPC ............. H04W 72/1273; H04W 76/11; H04W 72/042; H04W 72/1289; H04L 1/1819; H04L 5/0055
See application file for complete search history.

(56) References Cited

U.S. PATENT DOCUMENTS

2005/0249162 A1* 11/2005 Kim ...................... H04L 1/1635
370/333
2009/0186644 A1* 7/2009 Suga ...................... H04W 72/04
455/500
(Continued)

FOREIGN PATENT DOCUMENTS

CN 101621364 A 1/2010
CN 102318254 A 1/2012
(Continued)

OTHER PUBLICATIONS

3GPP TSG RAN WG1 Meeting #88bis, Discussion on NR HARQ-ACK feedback mechanisms, Apr. 3-7, 2017, R1-1704583 (Year: 2017).*
(Continued)

*Primary Examiner* — Siren Wei
(74) *Attorney, Agent, or Firm* — Kilpatrick Townsend & Stockton, LLP

(57) ABSTRACT

Disclosed in an embodiment of the present application are a method and device for determining whether data is damaged, the method comprising: a terminal receiving a downlink control channel which is used for scheduling retransmission; according to the downlink control channel, the terminal determining whether damaged data is present dur-
(Continued)

ing N previous transmissions of a retransmitted data packet, which are scheduled by the downlink control channel, N being an integer greater than or equal to 1; hence, the terminal receives the downlink control channel which is used for scheduling retransmission, and determines, according to the downlink control channel, whether damaged data is present during the N previous transmissions of the retransmitted data packet, which are scheduled by the downlink control channel, thereby improving transmission performance.

18 Claims, 4 Drawing Sheets

(51) Int. Cl.
*H04W 76/11* (2018.01)
*H04L 1/18* (2006.01)
*H04L 5/00* (2006.01)
*H04W 72/04* (2009.01)

(52) U.S. Cl.
CPC ..... *H04W 72/042* (2013.01); *H04W 72/1289* (2013.01); *H04W 76/11* (2018.02)

(56) References Cited

U.S. PATENT DOCUMENTS

| | | | |
|---|---|---|---|
| 2011/0199961 A1 | 8/2011 | Narasimha et al. | |
| 2017/0026938 A1 | 1/2017 | Onggosanusi et al. | |
| 2018/0278379 A1* | 9/2018 | Sun | H04L 1/08 |
| 2018/0287744 A1* | 10/2018 | Sundararajan | H04L 1/1635 |
| 2018/0287745 A1* | 10/2018 | Sun | H04L 1/0013 |

FOREIGN PATENT DOCUMENTS

| | | |
|---|---|---|
| CN | 105979597 A | 9/2016 |
| CN | 106506123 A | 3/2017 |
| CN | 106538019 A | 3/2017 |
| EP | 2645611 A1 | 10/2013 |
| WO | 2018203400 A1 | 11/2018 |

OTHER PUBLICATIONS

3GPP TSG RAN WG1 Meeting #88bis, eMBB/URLLC Multiplexing Solutions for Downlink, Apr. 3-7, 2017, R1-1706055 (Year: 2017).*
CATT: "Dicussion on NR HARQ-ACK feedback mechanisms", 3GPP TSG RAN WG1; R1-1704583, Spokane, USA; Apr. 3, 2017-Apr. 7, 2017.
ERICSSON: "eMBB/URLLC Multiplexing Solutions for Downlink", 3GPP TSG RAN WG1; R1-1706055, Spokane, USA; Apr. 3, 2017-Apr. 7, 2017.
Samsung: "Overview of CBG-based retransmission in NR", 3GPP TSG RAN WG1; R1-1705401; Spokane, USA; Apr. 3, 2017-Apr. 7, 2017.
LG Electronics: "Discussion on CB group based HARQ operation", 3GPP TSG RAN WG1, R1-1704916 Spokane, USA; Apr. 3, 2017-Apr. 7, 2017.
NTT DOCOMO, Inc."On DL dynamic multiplexing of eMBB and URLLC" 3GPP TSG RAN WG1 Meeting #88bis, Spokane, USA, Apr. 3-7, 2017, total 4 pages, R1-1705753.
Sequans Communications,"Puncturing indication and supplementary transmission for preemption-based multiplexing of URLLC and eMBB in DL", 3GPP TSG RAN WG1 Meeting #88bis, Spokane, USA, Apr. 3-7, 2017, total 6 pages, R1-1705882.
Sony: "Dynamic Resource Sharing for eMBB/URLLC in DL", 3GPP TSG RAN WG1 Meeting #87, R1-1613047, Reno, USA, Nov. 14-18, 2016.
Sony: "Considerations on Dynamic Resource Sharing for eMBB/URLLC in DL", 3GPP TSG RAN WG1 NR Ad-Hoc Meeting, R1-1700677, Spokane, USA, Jan. 16-20, 2017.
Fujitsu: "Discussion on Preemption Indicator for Multiplexing eMBB and URLLC in Downlink", 3GPP TSG RAN WG1 Meeting#88, R1-1701920, Athens, Greece, Feb. 13-17, 2017.
LG Electronics: "Discussion on multiplexing of eMBB and URLLC for downlink", 3GPP TSG RAN WG1 Meeting #88, R1-1702488, Athens, Greece, Feb. 13-17, 2017.
Nokia et al.: "Punctured Scheduling for Low Latency Transmissions", 3GPP Draft; R1-167308, 3rd Generation Partnership Project (3GPP), Mobile Competence Centre; 650, Route Des Lucioles; F-06921 Sophia-Antipolis Cedex; France vol. RAN WG1, No. Gothenburg, Sweden; Aug. 22, 2016-Aug. 26, 2016 Aug. 21, 2016 (Aug. 21, 2016 ), XP051125827, Retrieved from the Internet: URL: http://www.3gpp.org/ftp/Meetings_3G PP_SYNC/RAN 1 /Docs/ [retrieved on Aug. 21, 2016].

* cited by examiner

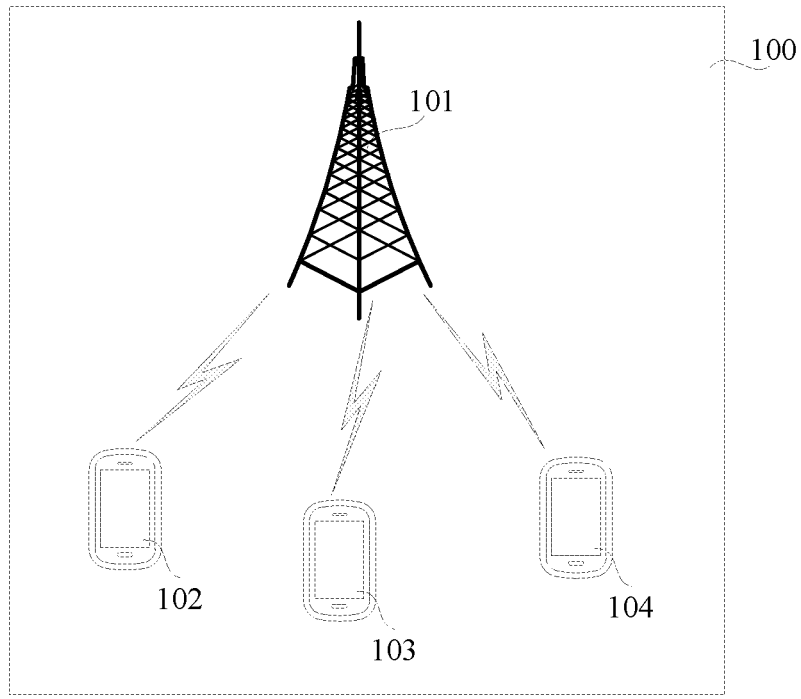

Fig. 1

```
┌─────────────────────────────────────────────────────────────┐
│ A terminal receives a downlink control channel transmitted  │  ___201
│         by a base station to schedule retransmission        │
└─────────────────────────────────────────────────────────────┘
                              │
                              │
┌─────────────────────────────────────────────────────────────┐
│  The terminal determines whether there are interrupted data │  ___202
│  among a number N of times previous transmissions of a      │
│  retransmission data packet scheduled by the downlink       │
│  control channel, according to the downlink control channel │
└─────────────────────────────────────────────────────────────┘
```

Fig. 2

METHOD AND DEVICE FOR DETERMINING WHETHER DATA IS DAMAGED

This application is a National Stage of International Application No. PCT/CN2018/079029, filed Mar. 14, 2018, which claims priority to Chinese Patent Application No. 201710314194.6, filed May 5, 2017, both of which are hereby incorporated by reference in their entireties.

FIELD

The present application relates to the field of communications, and particularly to a method and device for determining whether data are interrupted.

BACKGROUND

As there is a varying demand for mobile communication services, the international Telecommunication Union (ITU), the 3$^{rd}$ Generation Partnership Project (3GPP), and other organizations have come to their studies on new wireless communication systems, e.g., a 5G system. The new wireless communication systems may support various coexisting types of services, e.g., a Ultra-Reliable and Low-Latency Communication (URLLC) service, an enhanced Mobile Broad Band (eMBB) service, a massive Machine Type Communication (eMTC) service, etc.

In a Long Term Evolution (LTE) system, data are transmitted in a Transport Block (TB) each time; and taking downlink transmission as an example, a terminal shall feed back Acknowledgement (ACK) or Non-Acknowledgement (NACK) for a TB transmitted in a Physical Downlink Shared Channel (PDSCH) upon reception of the PDSCH.

Since the complexity of an encoder is limited, a TB shall be segmented into K Code Blocks (CBs), each CB shall be encoded, a Cyclic Redundancy Check (CRC) shall be added thereto, and the encoded CBs shall be concatenated together, mapped and transmitted. Since each CB is encoded separately, and includes the CRC, ACK/NACK feedback information may be generated for each CB in reality, and in order to reduce the amount of ACK/NACK feedback in the LTE system, ACK/NACK feedback is only made for a TB, that is, only if all the CBs in a TB are received correctly, then the TB will have been received correctly, and the terminal will feed back ACK as feedback information; and if any one of the CBs in the TB is received incorrectly, then feedback information for the TB will be NACK, so the base station side will retransmit the TB. Since the entire TB is retransmitted in the LTE system, there may be an unnecessary retransmission redundancy, thus degrading the transmission efficiency.

In the 5G system, retransmission of a Code Block Group (CBG) is supported, and after a TB is segmented into K CBs, there has been absent so far a definite method for combining K CBs, into which a TB is segmented, into CBGs. When various services are transmitted concurrently in the 5G system, for example, the terminal is accessing an eMBB service, where eMBB service data are carried in transport blocks, and data of a URLLC service are also transmitted in the transport blocks, so a part of the transport blocks carrying the eMBB service data tend to be occupied by the URLLC service data, and thus the eMBB service including the part of the eMBB service data overlapping with the URLLC service data may be covered with the URLLC service, that is, the transmitted part of the eMBB service overlapping with the URLLC service may be punctured, but the terminal accessing the eMBB service may not know that the really received overlapping part includes the URLLC service data.

Furthermore a Hybrid Automatic Repeat reQuest (HARQ) mechanism is supported for data transmission, that is, after a TB fails to be initially transmitted, it is retransmitted for a number N of times, and retransmitted data may be merged with lastly transmitted data to thereby improve the performance of transmission and demodulation. The terminal may not know that there are interrupted data among the eMBB service data which were lastly transmitted, or transmitted for the number N of times, of a retransmitted data packet, and further merge the retransmitted eMBB service data which are subsequently received, with the URLLC service data in the overlapping part, thus extending an error, and degrading the transmission performance of the eMBB service.

In summary, it is highly desirable to provide a method for determining whether data are interrupted so that the terminal may determine whether there are interrupted data among the data which were transmitted for the number N of times, of the currently retransmitted data packet.

SUMMARY

Embodiments of the application provide a method and device for determining whether data are interrupted, so that a terminal can determine whether there are interrupted data among the number N of times previous transmissions a retransmission data packet.

In a first aspect, an embodiment of the application provides a method for determining whether data are interrupted, the method including: receiving, by a terminal, a downlink control channel transmitted by a base station to schedule retransmission; and determining, by the terminal, whether there are interrupted data among a number N of times previous transmissions of a retransmission data packet scheduled by the downlink control channel, according to the downlink control channel, where N is an integer more than or equal to 1.

Optionally the downlink control channel includes a first indicating field indicating which Code Block Groups (CBGs) among CBGs into which an initially transmitted Transport Block (TB) is segmented are to be retransmitted in a shared channel scheduled by the downlink control channel.

Optionally the first indicating field exists or is valid only in a downlink control channel scheduling retransmission; or the first indicating field exists or is valid when the terminal is configured to transmit data with CBGs; or the first indicating field exists or is valid in any downlink control channel.

Optionally the terminal determines whether the downlink control channel is a downlink control channel scheduling retransmission as follows.

The terminal determines whether the downlink control channel is a downlink control channel scheduling retransmission according to a Downlink Control Information (DCI) format used for the downlink control channel; or the terminal determines whether the downlink control channel is a downlink control channel scheduling retransmission according to a Radio Network Temporary Identity (RNTI) used for the downlink control channel; or the terminal determines whether the downlink control channel is a downlink control channel scheduling retransmission according to a Hybrid Automatic Repeat reQuest (HARQ) process number and a new data indicating field in the downlink control channel; or when the downlink control channel includes the first indicating field indicating at least one CBG to be retransmitted, the terminal determines that the downlink control channel schedules retransmission.

Optionally the terminal determines whether there are interrupted data among the number N of times previous transmissions of the retransmission data packet scheduled by the downlink control channel, according to the downlink control channel in at least one of the following approaches.

In a first approach, when the terminal receives the downlink control channel before ACK/NACK information feedback of the number N of times previous transmissions of the retransmission data packet scheduled by the downlink control channel, the terminal determines that there are interrupted data among the number N of times previous transmissions of the retransmission data packet scheduled by the downlink control channel.

In a second approach, the downlink control channel includes a second indicating field including 1-bit indication information, or 1-bit indication information for each TB scheduled by the downlink control channel to be transmitted in the same shared channel, where the second indicating field indicates whether there are interrupted data among the number N of times previous transmissions of the retransmission data packet scheduled by the downlink control channel.

In a third approach, the downlink control channel includes a second indicating field including M-bit indication information, or M-bit indication information for each TB scheduled by the downlink control channel to be transmitted in the same shared channel, where 1-bit in the M-bit indication information corresponds to one of CBGs into which an initially transmitted TB is segmented, and indicates whether there are interrupted data among the number N of times previous transmissions of the corresponding CBG, where M is an integer more than or equal to 1.

In a fourth approach, the terminal receives a shared channel scheduled by the downlink control channel, where the shared channel includes a third indicating field indicating whether there are interrupted data among the number N of times previous transmissions of the retransmission data packet scheduled by the downlink control channel.

Optionally when it is determined in the first approach or the second approach that there are interrupted data among the number N of times previous transmissions of the retransmission data packet scheduled by the downlink control channel, the method further includes: if the downlink control channel includes the first indicating field, determining, by the terminal, that there are interrupted data among the number N of times previous transmissions of a CBG scheduled by the first indicating field in the downlink control channel to be retransmitted.

Optionally in the second approach or the third approach, the second indicating field exists or is valid only in a downlink control channel scheduling retransmission; or the second indicating field exists or is valid when the terminal is configured to transmit data with CBGs; or the second indicating field exists or is valid in any downlink control channel.

Optionally in the fourth approach, the third indicating field indicating whether there are interrupted data among the number N of times previous transmissions of the retransmission data packet scheduled by the downlink control channel, includes: the third indicating field indicating whether there are interrupted data among the number N of times previous transmissions of each CBG among CBGs into which an initially transmitted TB is segmented, or whether there are interrupted data among the number N of times previous transmissions of a CBG scheduled by the downlink control channel to be retransmitted, or which Code Block (CB) has interruption within the number N of previous transmissions of CBs in a CBG scheduled by the downlink control channel to be retransmitted, or which symbol has interruption within symbols occupied by the number of times previous transmissions, of a CBG scheduled by the downlink control channel to be retransmitted, or which symbols among symbols occupied by the number N of times previous transmissions of CBs in a CBG scheduled by the downlink control channel to be retransmitted.

Optionally the third indicating field, and the retransmitted information carried in the shared channel is encoded separately; and/or the third indicating field is transmitted over a resource corresponding to fixed CBG of CBGs carried in the shared channel, through puncturing or rate matching.

Optionally in the fourth approach, before the terminal obtains the third indicating field, the method further includes: determining, by the terminal, whether the third indicating field exists, including: determining that the third indicating field exists, upon determining that the shared channel carries retransmission; or determining, by the terminal, whether the third indicating field exists based on a fourth indicating field of at least one bit in the downlink control channel, where the fourth indicating field indicates whether the third indicating field exists in the shared channel; and when the terminal determines that the third indicating field exists, determining whether the third indicating field includes more bits of indication information, where: the third indicating field includes at least one bit of indication information to indicate whether the third indicating field includes more bits of indication information.

Optionally when the terminal determines that there are interrupted data, the terminal clears the interrupted data within stored data of the number N of times previous transmissions of the retransmitted data packet, or covers the interrupted data within stored data of the number N of times previous transmissions of the retransmitted data packet with corresponding data in the retransmitted data packet.

In a second aspect, an embodiment of the application provides another method for determining whether data are interrupted, the method including: transmitting, by a base station, a downlink control channel to a terminal to schedule retransmission; and notifying, by the base station, the terminal using the downlink control channel about whether there are interrupted data among a number N of times previous transmissions of a retransmission data packet scheduled by the downlink control channel, where N is an integer equal to or more than 1.

Optionally the downlink control channel includes a first indicating field indicating which Code Block Group (CBG) among segmented CBGs of an initially transmitted Transport Block (TB) is to be retransmitted in a shared channel scheduled by the downlink control channel.

Optionally the first indicating field exists or is valid only in a downlink control channel scheduling retransmission; or the first indicating field exists or is valid when the terminal is configured to transmit data with CBGs; or the first indicating field exists or is valid in any downlink control channel.

Optionally determining whether the downlink control channel is a downlink control channel scheduling retransmission includes: determining whether the downlink control channel is a downlink control channel scheduling retransmission according to a Downlink Control Information (DCI) format used for the downlink control channel; or determining whether the downlink control channel is a downlink control channel scheduling retransmission according to a Radio Network Temporary Identity (RNTI) used for the downlink control channel; or determining whether the downlink control channel is a downlink control channel scheduling retransmission according to a Hybrid Automatic Repeat reQuest (HARQ) process number and a new data indicating field in the downlink control channel; or when the downlink control channel includes the first indicating field indicating at least one CBG to be retransmitted, determining that the downlink control channel schedules retransmission.

Optionally the base station notifies the terminal using the downlink control channel about whether there are interrupted data among the number N of times previous transmissions of the retransmission data packet scheduled by the downlink control channel, in at least one of the following approaches.

In a first approach, when the base station transmits the downlink control channel before ACK/NACK information is fed back for the number N of times previous transmissions of the retransmission data packet scheduled by the downlink control channel, the base station notifies the terminal that it is determined that there are interrupted data among the number N of times previous transmissions of the retransmission data packet scheduled by the downlink control channel.

In a second approach, the downlink control channel includes a second indicating field including 1-bit indication information, or 1-bit indication information for each TB scheduled by the downlink control channel to be transmitted in the same shared channel, where the second indicating field indicates whether there are interrupted data among the number N of times previous transmissions of the retransmission data packet scheduled by the downlink control channel.

In a third approach, the downlink control channel includes a second indicating field including M-bit indication information, or M-bit indication information for each TB scheduled by the downlink control channel to be transmitted in the same shared channel, where 1-bit in the M-bit indication information corresponds to one of CBGs into which an initially transmitted TB is segmented, and indicates whether there are interrupted data among the number N of times previous transmissions of the corresponding CBG, where M is an integer more than or equal to 1.

In a fourth approach, the base station transmits a shared channel scheduled by the downlink control channel, where the shared channel includes a third indicating field indicating whether there are interrupted data among the number N of times previous transmissions of the retransmission data packet scheduled by the downlink control channel.

Optionally when it is determined in the first approach or the second approach that there are interrupted data among the number N of times previous transmissions of the retransmission data packet scheduled by the downlink control channel, the method further includes: when the downlink control channel includes the first indicating field, notifying the terminal that it is determined there are interrupted data among the number N of times previous transmissions of a CBG scheduled by the first indicating field in the downlink control channel to be retransmitted.

Optionally in the second approach or the third approach, the second indicating field exists or is valid only in a downlink control channel scheduling retransmission; or the second indicating field exists or is valid when the terminal is configured to transmit data with CBGs; or the second indicating field exists or is valid in any downlink control channel.

Optionally in the fourth approach, the third indicating field indicating whether there are interrupted data among the number N of times previous transmissions of the retransmission data packet scheduled by the downlink control channel, includes: the third indicating field indicating whether there are interrupted data among the number N of times previous transmissions of each CBG among CBGs into which an initially transmitted TB is segmented, or whether there are interrupted data among the number N of times previous transmissions of a CBG scheduled by the downlink control channel to be retransmitted, or which Code Block (CB) has interruption within the number N of times previous transmissions of CBs in a CBG scheduled by the downlink control channel to be retransmitted, or which symbol has interruption within symbols occupied by the number of times previous transmissions, of a CBG scheduled by the downlink control channel to be retransmitted, or which symbols among symbols occupied by the number N of times previous transmissions of CBs in a CBG scheduled by the downlink control channel to be retransmitted.

Optionally the third indicating field, and the retransmitted information carried in the shared channel is encoded separately; and/or the third indicating field is transmitted over a resource corresponding to fixed CBG of the CBGs carried in the shared channel, through puncturing or rate matching.

Optionally in the fourth approach, before the base station generates the third indicating field, the method further includes: determining, by the base station, whether the third indicating field exists, including: determining that the third indicating field exists, upon determining that the shared channel carries retransmission; or determining, by the base station, whether the third indicating field exists based on a fourth indicating field of at least one bit in the downlink control channel, where the fourth indicating field indicates whether the third indicating field exists in the shared channel, determining, by the base station, whether the third indicating field exists, and notifying the terminal using the fourth indicating field; and when the base station determines that the third indicating field exists, determining whether the third indicating field includes more bits of indication information, including: when the third indicating field includes at least one bit of indication information to indicate whether the third indicating field includes more bits of indication information, determining, by the base station, whether the third indicating field includes more bits of indication information, and notifying the terminal using the 1-bit indication information.

In a third aspect, an embodiment of the application provides a terminal including: a receiving device configured to receive a downlink control channel transmitted by a base station to schedule retransmission; and a processing device configured to determine whether there are interrupted data among a number N of times previous transmissions of a retransmission data packet scheduled by the downlink control channel, according to the downlink control channel, where N is an integer more than or equal to 1.

Optionally the downlink control channel includes a first indicating field indicating which Code Block Group (CBG) among segmented CBGs of an initially transmitted Transport Block (TB) is to be retransmitted in a shared channel scheduled by the downlink control channel.

Optionally the first indicating field exists or is valid only in a downlink control channel scheduling retransmission; or the first indicating field exists or is valid when the terminal is configured to transmit data with CBGs; or the first indicating field exists or is valid in any downlink control channel.

Optionally the processing device configured to determine whether the downlink control channel is a downlink control channel scheduling retransmission is configured: to determine whether the downlink control channel is a downlink control channel scheduling retransmission according to a Downlink Control Information (DCI) format used for the downlink control channel; or to determine whether the downlink control channel is a downlink control channel scheduling retransmission according to a Radio Network Temporary Identity (RNTI) used for the downlink control channel; or to determine whether the downlink control channel is a downlink control channel scheduling retransmission according to a Hybrid Automatic Repeat reQuest (HARQ) process number and a new data indicating field in the downlink control channel; or when the downlink control channel includes a first indicating field indicating at least one CBG to be retransmitted, to determine that the downlink control channel schedules retransmission.

Optionally the processing device is configured to determine whether there are interrupted data among the number N of times previous transmissions of the retransmission data packet scheduled by the downlink control channel, according to the downlink control channel in at least one of the following approaches.

In a first approach, when the terminal receives the downlink control channel before ACK/NACK information feedback of the number N of times previous transmissions of the retransmission data packet scheduled by the downlink control channel, determining that there are interrupted data among the number N of times previous transmissions of the retransmission data packet scheduled by the downlink control channel.

In a second approach, the downlink control channel includes a second indicating field including 1-bit indication information, or 1-bit indication information for each TB scheduled by the downlink control channel to be transmitted in the same shared channel, where the second indicating field indicates whether there are interrupted data among the number N of times previous transmissions of the retransmission data packet scheduled by the downlink control channel.

In a third approach, the downlink control channel includes a second indicating field including M-bit indication information, or M-bit indication information for each TB scheduled by the downlink control channel to be transmitted in the same shared channel, where 1-bit in the M-bit indication information corresponds to one of CBGs into which an initially transmitted TB is segmented, and indicates whether there are interrupted data among the number N of times previous transmissions of the corresponding CBG, where M is an integer more than or equal to 1.

In a fourth approach, the receiving device receives a shared channel scheduled by the downlink control channel, where the shared channel includes a third indicating field indicating whether there are interrupted data among the number N of times previous transmissions of the retransmission data packet scheduled by the downlink control channel.

Optionally when it is determined in the first approach or the second approach that there are interrupted data among the number N of times previous transmissions of the retransmission data packet scheduled by the downlink control channel, the processing device is further configured: when the downlink control channel includes the first indicating field, to determine that there are interrupted data among data which were transmitted for the number N of times, of a CBG scheduled by the first indicating field in the downlink control channel to be retransmitted.

Optionally in the second approach or the third approach, the second indicating field exists or is valid only in a downlink control channel scheduling retransmission; or the second indicating field exists or is valid when the terminal is configured to transmit data with CBGs; or the second indicating field exists or is valid in any downlink control channel.

Optionally in the fourth approach, the third indicating field indicating whether there are interrupted data among the number N of times previous transmissions of the retransmission data packet scheduled by the downlink control channel, includes: the third indicating field indicating whether there are interrupted data among the number N of times previous transmissions of each CBG among CBGs into which an initially transmitted TB is segmented, or whether there are interrupted data among the number N of times previous transmissions of a CBG scheduled by the downlink control channel to be retransmitted, or which Code Block (CB) has interruption within the number N of times previous transmissions of CBs in a CBG scheduled by the downlink control channel to be retransmitted, or which symbol has interruption within symbols occupied by the number of times previous transmissions, of a CBG scheduled by the downlink control channel to be retransmitted, or which symbols among symbols occupied by the number N of times previous transmissions of CBs in a CBG scheduled by the downlink control channel to be retransmitted.

Optionally the third indicating field, and the retransmitted information carried in the shared channel is encoded separately; and/or the third indicating field is transmitted over a resource corresponding to fixed CBG of the CBGs carried in the shared channel, through puncturing or rate matching.

Optionally in the fourth approach, the processing device configured to determine whether the third indicating field exists is further configured: to determine that the third indicating field exists, upon determining that the shared channel carries retransmission; or to determine whether the third indicating field exists based on a fourth indicating field of at least one bit in the downlink control channel, where the fourth indicating field indicates whether the third indicating field exists in the shared channel; and when the terminal determines that the third indicating field exists, to determine whether the third indicating field includes more bits of indication information, where: the third indicating field includes at least one bit of indication information to indicate whether the third indicating field includes more bits of indication information.

Optionally the processing device is further configured: when it is determined that there are interrupted data, to clear the interrupted data within the stored data of the number N of times previous transmissions of the retransmitted data packet, or to cover the interrupted data within stored data of the number of times previous transmissions of the retransmitted data packet with corresponding data in the retransmitted data packet.

In a fourth aspect, an embodiment of the application provides a base station including: a transmitting device configured to transmit a downlink control channel to a terminal to schedule retransmission; and a processing device configured to notify the terminal using the downlink control channel about whether there are interrupted data among a number N of times previous transmissions of a retransmission data packet scheduled by the downlink control channel, where N is an integer more than or equal to 1.

Optionally the downlink control channel includes a first indicating field indicating which Code Block Group (CBG) among segmented CBGs of an initially transmitted Transport Block (TB) is to be retransmitted in a shared channel scheduled by the downlink control channel.

Optionally the first indicating field exists or is valid only in a downlink control channel scheduling retransmission; or the first indicating field exists or is valid when the terminal is configured to transmit data with CBGs; or the first indicating field exists or is valid in any downlink control channel.

Optionally the processing device configured to determine whether the downlink control channel is a downlink control channel scheduling retransmission is configured: to determine whether the downlink control channel is a downlink control channel scheduling retransmission according to a Downlink Control Information (DCI) format used for the downlink control channel; or to determine whether the downlink control channel is a downlink control channel scheduling retransmission according to a Radio Network Temporary Identity (RNTI) used for the downlink control channel; or to determine whether the downlink control channel is a downlink control channel scheduling retransmission according to a Hybrid Automatic Repeat reQuest (HARQ) process number and a new data indicating field in the downlink control channel; or when the downlink control channel includes a first indicating field indicating at least one CBG to be retransmitted, to determine that the downlink control channel schedules retransmission.

Optionally the processing device is configured to notify the terminal using the downlink control channel about whether there are interrupted data among the number N of times previous transmissions of the retransmission data packet scheduled by the downlink control channel, in at least one of the following approaches.

In a first approach, when the transmitting device transmits the downlink control channel before ACK/NACK information is fed back for the number N of times previous transmissions of the retransmission data packet scheduled by the downlink control channel, the processing device notifies the terminal that it is determined that there are interrupted data among the number N of times previous transmissions of the retransmission data packet scheduled by the downlink control channel.

In a second approach, the downlink control channel includes a second indicating field including 1-bit indication information, or 1-bit indication information for each TB scheduled by the downlink control channel to be transmitted in the same shared channel, where the second indicating field indicates whether there are interrupted data among the number N of times previous transmissions of the retransmission data packet scheduled by the downlink control channel.

In a third approach, the downlink control channel includes a second indicating field including M-bit indication information, or M-bit indication information for each TB scheduled by the downlink control channel to be transmitted in the same shared channel, where 1-bit in the M-bit indication information corresponds to one of CBGs into which an initially transmitted TB is segmented, and indicates whether there are i interrupted data among the number N of times previous transmissions of the corresponding CBG, where M is an integer more than or equal to 1.

In a fourth approach, the transmitting device transmits a shared channel scheduled by the downlink control channel, where the shared channel includes a third indicating field indicating whether there are interrupted data among the number N of times previous transmissions of the retransmission data packet scheduled by the downlink control channel.

Optionally when it is determined in the first approach or the second approach that there are interrupted data among the number N of times previous transmissions of the retransmission data packet scheduled by the downlink control channel, the processing device is further configured, if the downlink control channel includes the first indicating field, to notify the terminal that it is determined there are interrupted data among data which were transmitted for the number N of times, of a CBG scheduled by the first indicating field in the downlink control channel to be retransmitted.

Optionally in the second approach or the third approach, the second indicating field exists or is valid only in a downlink control channel scheduling retransmission; or the second indicating field exists or is valid when the terminal is configured to transmit data with CBGs; or the second indicating field exists or is valid in any downlink control channel.

Optionally in the fourth approach, the third indicating field indicating whether there are interrupted data among the number N of times previous transmissions of the retransmission data packet scheduled by the downlink control channel, comprises: the third indicating field indicating whether there are interrupted data among the number N of times previous transmissions of each CBG among CBGs into which an initially transmitted TB is segmented, or whether there are interrupted data among the number N of times previous transmissions of a CBG scheduled by the downlink control channel to be retransmitted, or which Code Block (CB) has interruption within the number N of times previous transmissions of CBs in a CBG scheduled by the downlink control channel to be retransmitted, or which symbol has interruption within symbols occupied by the number of times previous transmissions, of a CBG scheduled by the downlink control channel to be retransmitted, or which symbols among symbols occupied by the number N of times previous transmissions of CBs in a CBG scheduled by the downlink control channel to be retransmitted.

Optionally the third indicating field, and the retransmitted information carried in the shared channel is encoded separately; and/or the third indicating field is transmitted over a resource corresponding to fixed CBG of the CBGs carried in the shared channel, through puncturing or rate matching.

Optionally in the fourth approach, the processing device configured to determine that the third indicating field exists is further configured: to determine that the third indicating field exists, upon determining that the shared channel carries retransmission; or to determine whether the third indicating field exists based on a fourth indicating field of at least one bit in the downlink control channel, where the fourth indicating field indicates whether the third indicating field exists in the shared channel, to determine whether the third indicating field exists, and to notify the terminal using the fourth indicating field; and if the processing device determines that the third indicating field exists, the processing device configured to determine whether the third indicating field includes more bits of indication information is further configured: when the third indicating field includes at least one bit of indication information to indicate whether the third indicating field includes more bits of indication information, to determine whether the third indicating field includes more bits of indication information, and to notify the terminal using the 1-bit indication information.

In a fifth aspect, an embodiment of the application provides a terminal including a processor and a memory, where: the processor is configured to read and execute program in the memory: to receive a downlink control channel transmitted by a base station to schedule retransmission; and to determine whether there are interrupted data among a number N of times previous transmissions of a retransmission data packet scheduled by the downlink control channel, according to the downlink control channel, where N is an integer more than or equal to 1.

Optionally the downlink control channel includes a first indicating field indicating which Code Block Group (CBG) among segmented CBGs of an initially transmitted Transport Block (TB) is to be retransmitted in a shared channel scheduled by the downlink control channel.

Optionally the first indicating field exists or is valid only in a downlink control channel scheduling retransmission; or the first indicating field exists or is valid when the terminal is configured to transmit data with CBGs; or the first indicating field exists or is valid in any downlink control channel.

Optionally the processor configured to determine whether the downlink control channel is a downlink control channel scheduling retransmission is configured: to determine whether the downlink control channel is a downlink control channel scheduling retransmission according to a Downlink Control Information (DCI) format used for the downlink control channel; or to determine whether the downlink control channel is a downlink control channel scheduling retransmission according to a Radio Network Temporary Identity (RNTI) used for the downlink control channel; or to determine whether the downlink control channel is a downlink control channel scheduling retransmission according to a Hybrid Automatic Repeat reQuest (HARQ) process number and a new data indicating field in the downlink control channel; or when the downlink control channel includes a first indicating field indicating at least one CBG to be retransmitted, to determine that the downlink control channel schedules retransmission.

Optionally the processor is configured to determine whether there are interrupted data among the number N of times previous transmissions of the retransmission data packet scheduled by the downlink control channel, according to the downlink control channel in at least one of the following approaches.

In a first approach, when the terminal receives the downlink control channel before ACK/NACK information feedback of the number N of times previous transmissions of the retransmission data packet scheduled by the downlink control channel, the terminal determines that there are interrupted data among the number N of times previous transmissions of the retransmission data packet scheduled by the downlink control channel.

In a second approach, the downlink control channel includes a second indicating field including 1-bit indication information, or 1-bit indication information for each TB scheduled by the downlink control channel to be transmitted in the same shared channel, where the second indicating field indicates whether there are interrupted data among the number N of times previous transmissions of the retransmission data packet scheduled by the downlink control channel.

In a third approach, the downlink control channel includes a second indicating field including M-bit indication information, or M-bit indication information for each TB scheduled by the downlink control channel to be transmitted in the same shared channel, where 1-bit in the M-bit indication information corresponds to one of CBGs into which an initially transmitted TB is segmented, and indicates whether there are interrupted data among a number N of times previous transmissions of the corresponding CBG, where M is an integer more than or equal to 1.

In a fourth approach, the terminal receives a shared channel scheduled by the downlink control channel, where the shared channel includes a third indicating field indicating whether there are interrupted data among the number N of times previous transmissions of the retransmission data packet scheduled by the downlink control channel.

Optionally when it is determined in the first approach or the second approach that there are interrupted data among the number N of times previous transmissions of the retransmission data packet scheduled by the downlink control channel, the processor is further configured: if the downlink control channel includes the first indicating field, to determine that there are interrupted data among the number N of times previous transmissions of a CBG scheduled by the first indicating field in the downlink control channel to be retransmitted.

Optionally in the second approach or the third approach, the second indicating field exists or is valid only in a downlink control channel scheduling retransmission; or the second indicating field exists or is valid when the terminal is configured to transmit data with CBGs; or the second indicating field exists or is valid in any downlink control channel.

Optionally in the fourth approach, the third indicating field indicating whether there are interrupted data among the number N of times previous transmissions of the retransmission data packet scheduled by the downlink control channel, includes: the third indicating field indicating whether there are interrupted data among the number N of times previous transmissions of each CBG among CBGs into which an initially transmitted TB is segmented, or whether there are interrupted data among the number N of times previous transmissions of a CBG scheduled by the downlink control channel to be retransmitted, or which Code Block (CB) has interruption within the number N of times previous transmissions of CBs in a CBG scheduled by the downlink control channel to be retransmitted, or which symbol has interruption within symbols occupied by the number of times previous transmissions, of a CBG scheduled by the downlink control channel to be retransmitted, or which symbols among symbols occupied by the number N of times previous transmissions of CBs in a CBG scheduled by the downlink control channel to be retransmitted.

Optionally the third indicating field, and the retransmitted information carried in the shared channel is encoded separately; and/or the third indicating field is transmitted over a resource corresponding to fixed CBG of the CBGs carried in the shared channel, through puncturing or rate matching.

Optionally in the fourth approach, the processor configured to determine whether the third indicating field exists is further configured: to determine that the third indicating field exists, upon determining that the shared channel carries retransmission; or determining, by the terminal, whether the third indicating field exists based on a fourth indicating field of at least one bit in the downlink control channel, where the fourth indicating field indicates whether the third indicating field exists in the shared channel; and if the terminal determines that the third indicating field exists, to determine whether the third indicating field includes more bits of indication information, where: the third indicating field includes at least one bit of indication information to indicate whether the third indicating field includes more bits of indication information.

Optionally the processor is further configured: when it is determined that there are interrupted data, to clear the interrupted data within the stored data of the number N of times previous transmissions of the retransmitted data packet, or to cover the interrupted data within stored data of the number N of times previous transmissions of the retransmitted data packet with corresponding data in the retransmitted data packet.

In a sixth aspect, an embodiment of the application provides a base station including a processor and a memory, where: the processor is configured to read and execute program in the memory: to transmit a downlink control channel to a terminal to schedule retransmission; and to notify the terminal using the downlink control channel about whether there are interrupted data among a number N of times previous transmissions of a retransmission data packet scheduled by the downlink control channel, where N is an integer more than or equal to 1.

Optionally the downlink control channel includes a first indicating field indicating which Code Block Group (CBG) among segmented CBGs of an initially transmitted Transport Block (TB) is to be retransmitted in a shared channel scheduled by the downlink control channel.

Optionally the first indicating field exists or is valid only in a downlink control channel scheduling retransmission; or the first indicating field exists or is valid when the terminal is configured to transmit data with CBGs; or the first indicating field exists or is valid in any downlink control channel.

Optionally the processor configured to determine whether the downlink control channel is a downlink control channel scheduling retransmission is configured: to determine whether the downlink control channel is a downlink control channel scheduling retransmission according to a Downlink Control Information (DCI) format used for the downlink control channel; or to determine whether the downlink control channel is a downlink control channel scheduling retransmission according to a Radio Network Temporary Identity (RNTI) used for the downlink control channel; or to determine whether the downlink control channel is a downlink control channel scheduling retransmission according to a Hybrid Automatic Repeat reQuest (HARQ) process number and a new data indicating field in the downlink control channel; or when the downlink control channel includes the first indicating field indicating at least one CBG to be retransmitted, to determine that the downlink control channel schedules retransmission.

Optionally the processor is configured to notify the terminal using the downlink control channel about whether there are interrupted data among the number N of times previous transmissions of the retransmission data packet scheduled by the downlink control channel, in at least one of the following approaches.

In a first approach, when the base station transmits the downlink control channel before ACK/NACK information is fed back for the number N of times previous transmissions of the retransmission data packet scheduled by the downlink control channel, the processor notifies the terminal that it is determined that there are interrupted data among the number N of times previous transmissions of the retransmission data packet scheduled by the downlink control channel.

In a second approach, the downlink control channel includes a second indicating field including 1-bit indication information, or 1-bit indication information for each TB scheduled by the downlink control channel to be transmitted in the same shared channel, where the second indicating field indicates whether there are interrupted data among the number N of times previous transmissions of the retransmission data packet scheduled by the downlink control channel.

In a third approach, the downlink control channel includes a second indicating field including M-bit indication information, or M-bit indication information for each TB scheduled by the downlink control channel to be transmitted in the same shared channel, where each bit in the M-bit indication information corresponds to one of CBGs into which an initially transmitted TB is segmented, and indicates whether there are interrupted data among the number N of times previous transmissions of the corresponding CBG, where M is an integer more than or equal to 1.

In a fourth approach, the base station transmits a shared channel scheduled by the downlink control channel, where the shared channel includes a third indicating field indicating whether there are interrupted data among the number N of times previous transmissions of the retransmission data packet scheduled by the downlink control channel.

Optionally when it is determined in the first approach or the second approach that there are interrupted data among the number N of times previous transmissions of the retransmission data packet scheduled by the downlink control channel, the processor is further configured, if the downlink control channel includes the first indicating field, to notify the terminal that it is determined there are interrupted data among data which were transmitted for the number N of times, of a CBG scheduled by the first indicating field in the downlink control channel to be retransmitted.

Optionally in the second approach or the third approach, the second indicating field exists or is valid only in a downlink control channel scheduling retransmission; or the second indicating field exists or is valid when the terminal is configured to transmit data with CBGs; or the second indicating field exists or is valid in any downlink control channel.

Optionally in the fourth approach, the third indicating field indicates whether there are interrupted data among the number N of times previous transmissions of the retransmission data packet scheduled by the downlink control channel, where: the third indicating field indicates whether there are interrupted data among a number N of times previous transmissions of each CBG among CBGs into which an initially transmitted TB is segmented, or whether there are interrupted data among a number N of times previous transmissions of a CBG scheduled by the downlink control channel to be retransmitted, or which Code Block (CB) has interruption within a number N of times previous transmissions of CBs in a CBG scheduled by the downlink control channel to be retransmitted, or which symbol has interruption within symbols occupied by a number N of times previous transmissions of a CBG scheduled by the downlink control channel to be retransmitted, or which symbols among symbols occupied by a number N of times previous transmissions of CBs in a CBG scheduled by the downlink control channel to be retransmitted.

Optionally the third indicating field, and the retransmitted information carried in the shared channel is encoded separately; and/or the third indicating field is transmitted over a resource corresponding to fixed CBG of the CBGs carried in the shared channel, through puncturing or rate matching.

Optionally in the fourth approach, the processor configured to determine that the third indicating field exists is further configured: to determine that the third indicating field exists, upon determining that the shared channel carries retransmission; or to determine whether the third indicating field exists based on a fourth indicating field of at least one bit in the downlink control channel, where the fourth indicating field indicates whether the third indicating field exists in the shared channel, to determine whether the third indicating field exists, and to notify the terminal using the fourth indicating field; and if the processor determines that the third indicating field exists, the processor configured to determine whether the third indicating field includes more bits of indication information is further configured: when the third indicating field includes at least one bit of indication information to indicate whether the third indicating field includes more bits of indication information, to determine whether the third indicating field includes more bits of indication information, and to notify the terminal using the 1-bit indication information.

In a seventh aspect, an embodiment of the application provides a cache synchronization exception device readable storage medium including program codes configured, upon being executed on a computer device, to cause the computer device to perform the method according to any one of the embodiments in the first aspect, or the method according to any one of the embodiments in the second aspect.

In the embodiments above of the application, the terminal receives a downlink control channel transmitted by the base station to schedule retransmission, and determines whether there are interrupted data among a number N of times previous transmissions of a retransmission data packet scheduled by the downlink control channel, according to the downlink control channel, thus improving the transmission performance, where N is an integer more than or equal to 1. As can be apparent, the terminal receives the downlink control channel to schedule retransmission, and determines whether there are interrupted data among the number N of times previous transmissions of the retransmission data packet scheduled by the downlink control channel, according to the downlink control channel, thus improving the transmission performance.

BRIEF DESCRIPTION OF THE DRAWINGS

In order to make the technical solutions according to the embodiments of the application more apparent, the drawings to which reference is to be made in the description of the embodiments will be introduced below in brief, and apparently the embodiments to be described below illustrate only a part but not all of the embodiments of the application. Those ordinarily skilled in the art can further derive other drawings from these drawings without any inventive effort.

FIG. 1 is a schematic diagram of a system architecture to which the embodiments of the application are applicable.

FIG. 2 is a schematic flow chart of a method for determining whether data are interrupted according to a first embodiment of the application.

DETAILED DESCRIPTION OF THE EMBODIMENTS

Figures 3, 4:
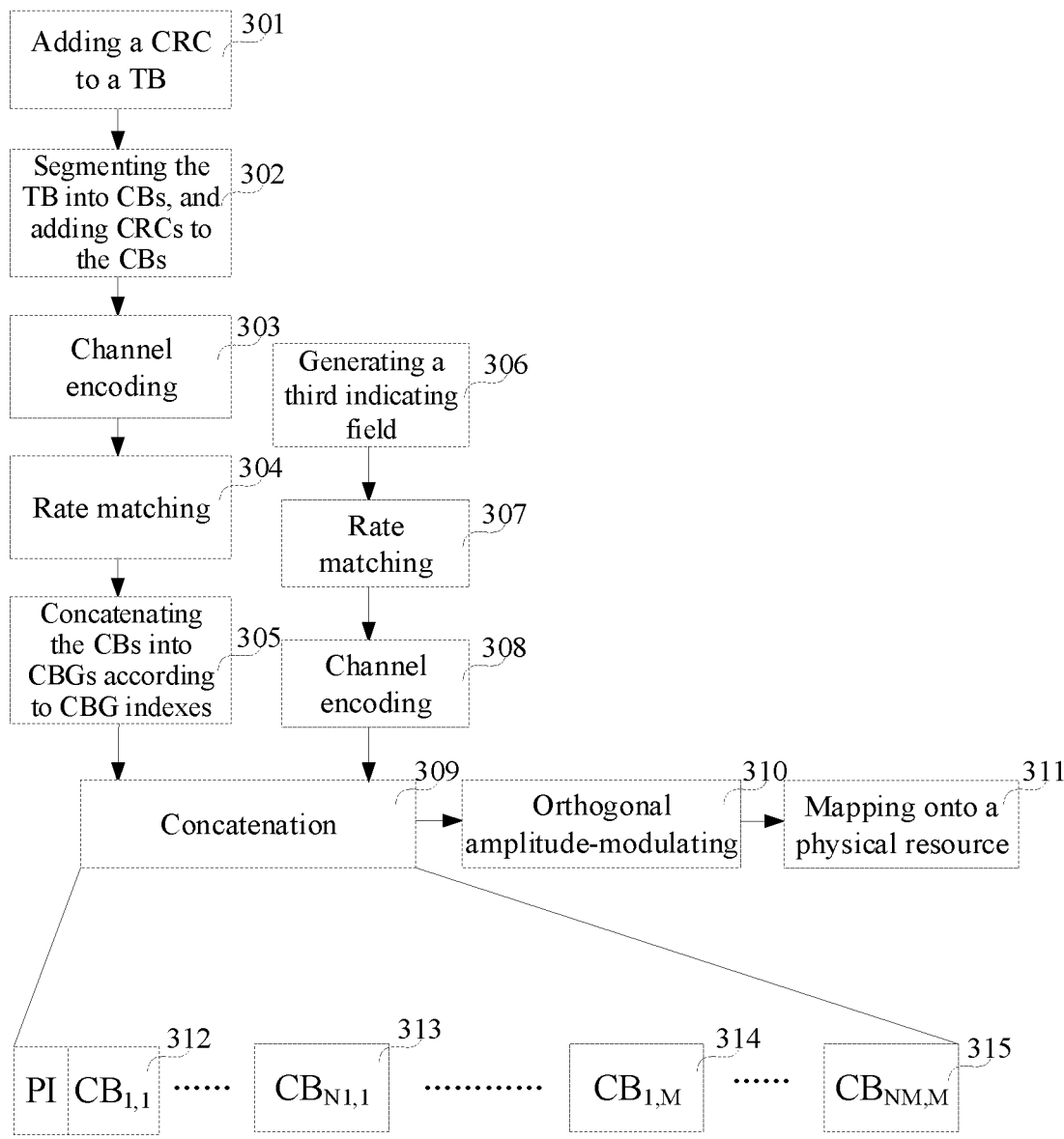
FIG. 3 illustrates a transport channel process according to an embodiment of the application.
FIG. 4 is a schematic flow chart of a method for determining whether data are interrupted according to a second embodiment of the application.

In order to make the objects, the technical solutions, and the advantages of the application more apparent, the application will be described below in further details with reference to the drawings.

The terms "first", "second", etc., in the description, the claims, and the drawings above of the application are intended to distinguish different objects from each other, but not to define any specific order thereof. Moreover the terms "include", "comprise", and any variants thereof are intended to comprehend nonexclusive inclusion. For example, a process, a method, a system, a product, or a device including a series of operations or elements will not be limited to the listed operations or elements, but can optionally further include a operation or operations or an element or elements which is or are not listed, or another operation or operations or element or elements inherent to the process, the method, the product, or the device.

A method for determining whether data are interrupted according to embodiments of the application can be applicable to various system architectures. FIG. 1 is a schematic diagram of a system architecture to which the embodiment of the application is applicable. As illustrated in FIG. 1, the system architecture 100 includes a base station 101 and one or more terminals, e.g., a terminal 102, a terminal 103, and a terminal 104. The base station 101 can transmit data with the terminal 102, the terminal 103, and the terminal 104 over a network.

In the embodiments of the application, the base station is a device deployed in a radio access network to provide a wireless communication function. For example, a device functioning as a base station in a 2G network includes a Base Transceiver Station (BTS) and a Base Station Controller (BSC), a device functioning as a base station in a 3G network includes a Node B and a Radio Network Controller (RNC), a device functioning as a base station in a 4G network includes an evolved Node B (eNB), a device functioning as a base station in a 5G network includes a New Radio Node B (gNB), a Centralized Unit (CU), a Distributed Device (DU), and a new radio controller, and a device functioning as a base station in a WLAN is an Access point (AP), or a New Radio NodeB AP.

The terminal refers to a device providing a user with voice and/or data connectivity, and includes a wireless terminal or a wired terminal. The wireless terminal can be a handheld device with a radio connection function, another processing device connected with a wireless modem, or a mobile terminal communicating with one or more core networks over a radio access network. For example, the wireless terminal can be a mobile phone (or a "cellular" phone), and a computer including a mobile terminal. In another example, the wireless terminal can be a portable, pocket, handheld, built-in-computer, or vehicular mobile device. In a further example, the wireless terminal can be a part of a mobile station, an access point, or a User Equipment (UE).

In a 5G system, transmission of a CBG is supported at present. That is, a TB is segmented into K Code Blocks (CBs), and then the K CBs can be grouped into a plurality of CBGs under some rule, and each CBG can include only one CB or can include K CBs (i.e., a TB). In the related art, there has been absent so far a definite method for combining K CBs, into which a TB is segmented, into CBGs, and there are the following possible implementations of the embodiment of the application: in a possible implementation, a fixed number of CBGs is configured, a TB is segmented into the fixed number of CBGs, and the number of CBs in each CBG varies with a Transport Block Size (TBS); in another possible implementation, a fixed number of CBs in each CBG is configured, and the number of CBGs into which a TB is segmented varies with a TBS; and in a further possible implementation, the number of CBGs, and/or the number of CBs in a CBG is or are defined according to a TBS.

In the embodiments of the application, a TB is configured with a fixed number of CBGs, and retransmission is performed based on a CBG, to thereby lower an unnecessary retransmission redundancy, and improved the transmission efficiency, as compared with retransmission of a TB in an LTE system.

FIG. 2 illustrates a schematic flow chart of a method for determining whether data are interrupted according to a first embodiment of the application. As illustrated in FIG. 2, the method includes the following operations.

In the operation 201, a terminal receives a downlink control channel transmitted by a base station to schedule retransmission.

In the operation 202, the terminal determines whether there are interrupted data among a number N of times previous transmissions of a retransmission data packet scheduled by the downlink control channel, according to the downlink control channel.

In the embodiment of the application, the terminal receives the downlink control channel transmitted by the base station to schedule retransmission, and determines whether there are interrupted data among the number N of times previous transmissions of the retransmission data packet scheduled by the downlink control channel, according to the downlink control channel, thus improving the transmission performance.

In an implementation, the data packet in the operation 202 may be one or more Transport Blocks (TBs), or may be one or more Code Block Groups (CBGs). That is, transmitted data in a TB can be retransmitted (for example, if all the CBGs in the TB are transmitted in error, the entire TB will be retransmitted), or transmitted data in a CBG can be retransmitted (for example, if only a part of CBGs are initially transmitted in error, then only the incorrect CBG will be retransmitted).

In the embodiment of the application, the interrupted data can be a CBG, or can be a Code Block (CB), or can be a symbol occupied by a CBG or a CB. Particularly if the terminal determines that there are interrupted data among the number N of times previous transmissions of the retransmission data packet, a part or all of information in the interrupted data may be punctured because a resource thereof is preempted by other transmission, that is, the information on the preempted resource is covered with other information.

For example, the interrupted data are a CBG including ten CBs. There are two cases of the interrupted data: in one case, all the information in the CBG is covered with other information, that is, all the ten CBs in the CBG are covered with other information; and in the other case, a part of information in the CBG is covered with other information, that is, only five CBs in the CBG are covered with other information. In another example, the interrupted data are interrupted data in a specific symbol occupied by the transmitted CBG, and for example, the symbol is preempted by other information. For example, the transmitted CBG occupies three symbols, and all the CBG information in the three symbols may be interrupted, or only the CBG information in one or two symbols may be interrupted; and when the terminal is notified of the corresponding symbol or symbols, the terminal can determine which part of the information in the CBG is interrupted, under a mapping rule.

Optionally the downlink control channel includes a first indicating field indicating which Code Block Groups (CBGs) among CBGs into which an initially transmitted Transport Block (TB) is segmented are to be retransmitted in a shared channel scheduled by the downlink control channel (that is, the first indicating field indicates those CBGs in the shared channel scheduled by the downlink control channel), so that the terminal can determine the CBGs to be retransmitted in the shared channel among the CBGs into which the initially transmitted TB is segmented, according to the first indicating field in the downlink control channel.

It shall be noted that the first indicating field indicating a CBG to be retransmitted can include the position of the CBG, and whether the CBG is to be retransmitted. For example, each CBG corresponds to one bit in the first indicating field to indicate whether the CBG at that CBG position is to be retransmitted, so there is an M-bit first indicating field for a TB segmented into M CBGs; and optionally a TB can correspond to a first indicating field, and there are A TBs transmitted in a channel, then there will be a first indicating field of A*M bits, where * represents a multiplication.

For example, the downlink control channel includes a first indicating field. If a TB1 is fixedly segmented into 4 CBGs, there will be four bits in the first indicating field, where each bit corresponds to one of the CBGs. The terminal will receive a downlink control channel in a timeslot 1 to schedule the TB1 to be initially transmitted in the shared channel, where an HARQ process number 0 is indicated in the downlink control channel, that is, the HARQ process number corresponding to the TB1 is 0. Four bits in the first indicating field in the downlink control channel are "0000" (for example, "0" indicates initial transmission, and "1" indicates retransmission). That is, the TB1 is segmented in four CBGs, so all of a CBG1, a CBG2, a CBG3, and a CBG4 are initially transmitted. For example, the terminal receives a downlink control channel in a timeslot 3, an HARQ process number 0 indicated in the downlink control channel is the same as the HARQ process number of the initially transmitted TB1, and the 4-bit first indicating field is "0101", so the first indicating field indicates that the CBG2 and the CBG4 are currently retransmitted. That is, the downlink control channel in the timeslot 3 is a downlink control channel scheduling the TB1 to be retransmitted, where the CBG2 and the CBG4 in the TB1 are retransmitted.

In the embodiments of the application, the first indicating field exists or is valid particularly in the following instances: in a first instance, the first indicating field exists or is valid only in a downlink control channel scheduling retransmission, or in a second instance, the first indicating field exists or is valid when the terminal is configured to transmit data with CBGs; or in a third instance, the first indicating field exists or is valid in any downlink control channel.

In the first instance, the first indicating field exists or is valid only in a downlink control channel scheduling retransmission. That is, the first indicating field does not exist or is not valid in a downlink control channel scheduling initial transmission. When the first indicating field is not valid, the bit field is reserved, and the terminal will not parse the bit field for any particular indication information. When the first indicating field is valid, the first indicating field definitively exists, and the terminal shall parse the bit field for particular indication information. When the first indicating field exists only in a downlink control channel scheduling retransmission, there may be different Downlink Control Information (DCI) formats (e.g., including different numbers of DCI bits) for downlink control channels scheduling initial transmission and retransmission.

In the second instance, the first indicating field exists or is valid when the terminal is configured to transmit data (e.g., retransmit the data and make feedback for the data) in a CBG. That is, if the terminal is not configured to transmit data in a CBG i.e., the terminal is configured to transmit data in a TB, there will be no first indicating field. Optionally before data are transmitted in a CBG the terminal receives configuration signaling, and decides whether to enable CBG retransmission; and if the terminal decides to enable CBG retransmission, the terminal will retransmit data in a CBG; otherwise, the terminal will retransmit data in a TB. The configuration signaling is higher-layer signaling, or indication information transmitted in the downlink control channel.

In the third instance, the first indicating field exists or is valid in any downlink control channel. That is, the downlink control channel scheduling either initial transmission or retransmission includes the first indicating field, or the first indicating field is valid, so there may be a uniform DCI format.

In the embodiments of the application, the terminal shall determine whether the downlink control channel is a downlink control channel scheduling retransmission, upon reception of the downlink control channel. In an optional implementation, the terminal determines whether the downlink control channel is a downlink control channel scheduling retransmission, according to a DCI format used for the downlink control channel, or a Radio Network Temporary Identity (RNTI) used for the downlink control channel, or an HARQ process number and a new data indicating field in the downlink control channel; or when the downlink control channel includes the first indicating field indicating at least one CBG to be retransmitted, the terminal determines that the downlink control channel schedules retransmission.

If the downlink control channel received by the terminal schedules a data packet to be initially transmitted, the data packet to be initially transmitted will be placed into a buffer of the terminal for merging with subsequent retransmission of the data packet; and if the downlink control channel received by the terminal is a downlink control channel scheduling retransmission, the terminal will determine whether there are interrupted data among the number N of times previous transmissions of the retransmission data packet scheduled by the downlink control channel, particularly in at least one of the following approaches.

In a first approach, when the terminal receives the downlink control channel before ACK/NACK information feedback of the number N of times previous transmissions of the retransmission data packet scheduled by the downlink control channel, the terminal determines that there are interrupted data among the number N of times previous transmissions of the retransmission data packet scheduled by the downlink control channel.

In a particular implementation, when the terminal receives a downlink control channel scheduling a part or all of information in a data packet to be retransmitted before it feeds back ACK/NACK information for the i-th transmission of the data packet, the terminal determines that there are interrupted data among data which were transmitted for the i-th time and/or before the i-th time of transmission, of the data packet; and the terminal determines which part of the data is interrupted, or when the downlink control channel includes the first indicating field, the terminal determines the interrupted data as a CBG corresponding to a CBG position indicated for retransmission in the first indicating field among the data which were transmitted for the i-th time and/or before the i-th time of transmission, of the data packet, where i is an integer more than 1.

For example, the downlink control channel includes the first indicating field, and a TB is segmented into four CBGs including a CBG1, a CBG2, a CBG3, and a CBG4, so there are four bits in the first indicating field. The terminal receives a downlink control channel in a timeslot 1 to schedule the TB1 to be initially transmitted in a shared channel, where an HARQ process number corresponding to the TB1 is 0. Four bits in the first indicating field in the downlink control channel are "0000" (for example, "0" indicates initial transmission, and "1" indicates retransmission). That is, all the four CBGs in the TB1 are initially transmitted. For example, the terminal receives a downlink control channel in a timeslot 3, an HARQ process number 0 indicated in the downlink control channel is the same as the HARQ process number of the TB1, and the 4-bit first indicating field is "0101", so the first indicating field indicates that the CBG2 and the CBG4 are currently retransmitted, which means that the downlink control channel in the timeslot 3 is a downlink control channel scheduling the TB1 to be retransmitted, where the CBG2 and the CBG4 in the TB1 are retransmitted.

For example, the terminal feeds back ACK/NACK feedback information for the TB1, in a timeslot 4, so if the terminal receives a downlink control channel scheduling the TB1 to be retransmitted, before the timeslot 4, e.g., in the timeslot 3, the terminal may determine implicitly that data before the TB1 are punctured because a resource thereof is occupied by other transmission. That is, a part of the data is interrupted; and the terminal can determine which one of the CBGs is interrupted, according to the correlation between the CBGs, or the terminal can determine a retransmitted CBG indicated by the first indicating field in the downlink control channel received in the timeslot 3, as an interrupted CBG In a second approach, the downlink control channel includes a second indicating field including 1-bit indication information, or 1-bit indication information for each TB scheduled by the downlink control channel to be transmitted in the same shared channel, where the second indicating field indicates whether there are interrupted data among the number N of times previous transmissions of the retransmission data packet scheduled by the downlink control channel.

In a particular implementation, there is 1-bit indication information corresponding to each TB. If there is only one TB which is currently transmitted, the second indicating field will be 1-bit information. If there are a plurality of TBs which are currently transmitted, e.g., A TBs, the second indicating field will be A-bit information. When there are a plurality of TBs, the second indicating fields of the respective TBs can be adjacent to each other to thereby constitute an indicating field, or can be separate from each other to thereby constitute two second indicating fields. The second indicating field and the first indicating field can be located at adjacent bit positions, or can be separate from each other.

For example, the terminal receives a downlink control channel in a timeslot 1 to schedule a TB1 to be initially transmitted in a shared channel, and a downlink control channel in a timeslot 3 to schedule the TB1 to be retransmitted includes a 1-bit second indicating field. For example, when the 1-bit second indicating field is set to "1" or "True", it indicates that there are interrupted data among data which were transmitted for the number N of times, of the TB1, and when the 1-bit second indicating field is set to "0" or "False", it indicates that there are no interrupted data among the data which were transmitted for the number N of times, of the TB1; or when the 1-bit second indicating field is set to "1" or "True", it indicates that there are no interrupted data among data which were transmitted for the number N of times, of the TB1, and when the 1-bit second indicating field is set to "0" or "False", it indicates that there are interrupted data among the data which were transmitted for the number N of times, of the TB1.

When it is determined that there are interrupted data among the data which were transmitted for the number N of times, of the TB1, the terminal can determine which one of the CBGs is interrupted, according to the correlation between the CBGs, or the terminal can determine a retransmitted CBG indicated by the first indicating field in the downlink control channel received in the timeslot 3, as an interrupted CBG In a third approach, the downlink control channel includes a second indicating field including M-bit indication information, or M-bit indication information for each TB scheduled by the downlink control channel to be transmitted in the same shared channel, where each 1-bit in the M-bit indication information corresponds to one of CBGs into which an initially transmitted TB is segmented, and indicates whether there are interrupted data among the number N of times previous transmissions of the corresponding CBG, where M is an integer more than or equal to 1.

In a particular implementation, each TB corresponds to an M-bit second indicating field, and if there is only one TB which is currently transmitted, the second indicating field will be M-bit indication information; and if there are a plurality of TBs which are currently transmitted, e.g., A TBs, then the second indicating field will be indication information of A*M bits. When there are a plurality of TBs, the second indicating fields of the respective TBs can be adjacent to each other to thereby constitute an indicating field, or can be separate from each other to thereby constitute two second indicating fields. The second indicating field and the first indicating field can be located at adjacent bit positions, or can be separate from each other.

For example, there is one TB which is currently transmitted, each TB includes M CBGs, and the second indicating field includes M bits. For example, each bit in the M-bit second indicating field corresponds to one of the CBGs, and when a bit in the second indicating field corresponding to a CBG is set to "0", it indicates that the CBG which was lastly transmitted is interrupted by other information, that is, the CBG which was lastly transmitted can not be merged with subsequent retransmission thereof; and when a bit in the second indicating field corresponding to a CBG is set to "1", it indicates that the CBG which was lastly transmitted is not interrupted, that is, the CBG which was lastly transmitted can be merged with subsequent retransmission thereof.

If all the M bits in the second indicating field are "0", then it will indicate that each CBG in the TB is interrupted by other information, that is, none of the CBGs which were lastly transmitted can not be merged with the corresponding CBG which are subsequently retransmitted, that is, the TB which was lastly transmitted can not be merged with the TB which is subsequently retransmitted; and if all the M bits are "1", then it will indicate that the entire TB which was transmitted is not interrupted by other information, that is, all the M CBGs in the TB, which were lastly transmitted can be merged with the corresponding CBG which are subsequently retransmitted, that is, all the M CBGs in the TB, which were lastly transmitted can be merged with the TB which is subsequently retransmitted; or when a bit in the second indicating field is set to "1", it indicates that a CBG is interrupted, and when the bit in the second indicating field is set to "0", it indicates that the CBG is not interrupted.

For example, a TB1 is segmented into four CBGs including a CBG1, a CBG2, a CBG3, and a CBG4, the terminal receives a downlink control channel in a timeslot 1 to schedule the TB1 to be initially transmitted, and a downlink control channel received in a timeslot 3 to schedule the TB1 to be retransmitted includes a 4-bit second indicating field; and for example, the 4-bit second indicating field is "0100", so the terminal determines that there are interrupted data among the TB1 which was lastly transmitted, and the interrupted data are the CBG2 which was lastly transmitted.

The terminal does not merge retransmitted information of the CBG2 received in a shared channel scheduled by the downlink control channel in the timeslot 3 with information of the CBG2, stored in the buffer, received in the initially transmitted TB1 in the timeslot 1 to thereby avoid the interrupted data from affecting retransmitted data, and the terminal can further clear the information of the CBG2, stored in the buffer, received in the initially transmitted TB1 in the timeslot 1 to release this part of the buffer.

In a fourth approach, the terminal receives a shared channel scheduled by the downlink control channel, where the shared channel includes a third indicating field indicating whether there are interrupted data among the number N of times previous transmissions of the retransmission data packet scheduled by the downlink control channel.

When it is determined in the first approach or the second approach that there are interrupted data among the number N of times previous transmissions of the retransmission data packet scheduled by the downlink control channel, if the downlink control channel includes the first indicating field, then the terminal will determine that there are interrupted data among data which were transmitted for the number N of times, of a CBG scheduled by the first indicating field in the downlink control channel to be retransmitted. Alternatively, the terminal will determine which part of the data which were transmitted for the number N of times, corresponding to the retransmitted data packet is interrupted, for example, through correlation detection, that is, the currently received retransmitted information is correlated with its corresponding stored information which was lastly transmitted, and if there is a high correlation, then the retransmitted information will not have been interrupted; otherwise, the retransmitted information will have been interrupted, so that it can be determined which one of CBGs in a TB is interrupted, or which part of CBs or symbols in which one of the CBG is interrupted.

In the second approach or the third approach, the second indicating field exists or is valid particularly in the following instances: in a first instance, the second indicating field exists or is valid only in a downlink control channel scheduling retransmission, or in a second instance, the second indicating field exists or is valid when the terminal is configured to transmit data with CBGs; or in a third instance, the second indicating field exists or is valid in any downlink control channel.

In the first instance, the second indicating field exists or is valid only in a downlink control channel scheduling retransmission, that is, the second indicating field does not exist or is not valid in a downlink control channel scheduling initial transmission, where when the second indicating field is not valid, the bit field is reserved, and the terminal will not parse the bit field for any particular indication information; and when the second indicating field is valid, the terminal shall parse the bit field for particular indication information. When the second indicating field exists only in a downlink control channel scheduling retransmission, there may be different DCI formats (e.g., including different numbers of DCI bits) for downlink control channels scheduling initial transmission and retransmission.

In the second instance, the second indicating field exists or is valid when the terminal is configured to transmit data with CBGs, that is, if the terminal is not configured to transmit data in a CBG, that is, the terminal only transmits data in a TB, then the second indicating field will not exist or will be not valid.

In the third instance, the second indicating field exists or is valid in any downlink control channel, that is, the downlink control channel scheduling either initial transmission or retransmission includes the second indicating field, or the second indicating field is valid by default, so there may be a uniform DCI format.

In the fourth approach, the third indicating field indicates whether there are interrupted data among the number N of times previous transmissions of the retransmission data packet scheduled by the downlink control channel, particularly in the following several situations.

In a first situation, the third indicating field indicates whether there are interrupted data among data which were transmitted for the number N of times, of each CBG among CBGs into which an initially transmitted TB is segmented, where the third indicating field includes at least A*M bits, where A is the number of TBs, and M is the number of CBGs into which each TB is segmented; and each of the M bits corresponds to one of the CBGs. For example, if a TB is segmented into M CBGs, then the third indicating field will indicate M bits to indicate whether there are interrupted data among the number N of times previous transmissions of the respective CBGs in the TB.

In a second situation, the third indicating field indicates whether there are interrupted data among the number N of times previous transmissions of a CBG scheduled by the downlink control channel to be retransmitted, in the following two cases.

In a first case, if the downlink control channel includes the first indicating field, then it may be determined which CBG is retransmitted, according to the first indicating field; and the third indicating field can include one bit indicating whether there are interrupted data among CBGs which were transmitted for the number N of times, corresponding to all the retransmitted CBGs indicated by the first indicating field; or the third indicating field can be separate from the first indicating field, and include A*M bits, where A is the number of TBs, M is the number of CBGs into which each TB is segmented, and each of the M bits corresponds to one of the CBGs, and at this time, the third indicating field indicates whether there are interrupted data among the number N of times previous transmissions corresponding to each CBG among CBGs into which each initially transmitted TB is segmented, that is, it can indicate any one of CBGs in any one initially transmitted TB instead of indicating only the retransmitted CBG indicated by the first indicating field.

In a second case, if the downlink control channel does not include any first indicating field, then the third indicating field above may further include an indicating field indicating which CBG is retransmitted, and for example, the indicating field may include A*M bits, where A is the number of TBs, M is the number of CBGs into which each TB is segmented, and each of the M bits corresponds to one of the CBGs; or the indicating field may include $\lceil \log_2^T \rceil$ bits corresponding to a CBG number, where T is the number of CBGs in which a TB is segmented, or the largest number of CBGs.

In a third instance, the third indicating field indicates which CBGs among CBGs scheduled by the downlink control channel to be retransmitted, which were transmitted for the number N of times include interrupted data, in the following two cases.

In a first case, if the downlink control channel includes the first indicating field, then it may be determined which CBG is retransmitted, according to the first indicating field; and the third indicating field will include indication information to indicate whether there are interrupted data among the number N of times previous transmissions of each CB in the retransmitted CBG, and for example, a CB corresponds to 1-bit indication information, and there are L bits of indication information, where L is the number of CBs in a CBG or the largest number of CBGs. Alternatively the third indicating field can be separate from the first indicating field, and includes A*M bits, where A is the number of TBs, M is the number of CBGs into which each TB is segmented, and each of the M bits corresponds to one of the CBGs, and indicates whether there are interrupted data among the number N of times previous transmissions corresponding to each of CBGs into which each initially transmitted TB is segmented, that is, it can indicate any one of CBGs in any one initially transmitted TB instead of indicating only the retransmitted CBG indicated by the first indicating field. Then the L bits of information for each CBG can further indicate which CB in the CBG includes interrupted data.

In a second case, if the downlink control channel does not include any first indicating field, then the third indicating field above may further include an indicating field indicating which CBG is retransmitted, and for example, the indicating field may include A*M bits, where A is the number of TBs, M is the number of CBGs into which each TB is segmented, and each of the M bits corresponds to one of the CBGs; or the indicating field may include $\lceil \log_2^T \rceil$ bits corresponding to a CBG number, where T is the number of CBGs in which a TB is segmented, or the largest number of CBGs.

In a fourth situation, the third indicating field indicates which symbols among symbols occupied by data which were transmitted for the number N of times, of a CBG scheduled by the downlink control channel to be retransmitted, include interrupted data, in the following two cases.

In a first case, if the downlink control channel includes the first indicating field, then it may be determined which CBG is retransmitted, according to the first indicating field; and the third indicating field includes indication information to indicate which one of symbols occupied by data which were transmitted for the number N of times, of a CBG includes interrupted data, and for example, a symbol corresponds to 1-bit indication information, and there are K bits of indication information, where K is the number of symbols occupied by data which were transmitted for the number N of times, of a CBG or the largest number of symbols; or the third indicating field can be separate from the first indicating field, and include A*M bits, where A is the number of TBs, M is the number of CBGs into which each TB is segmented, and each of the M bits corresponds to one of the CBGs, and indicates whether there are interrupted data among the number N of times previous transmissions corresponding to each CBG among CBGs into which each initially transmitted TB is segmented, that is, it can indicate any one of CBGs in any one initially transmitted TB instead of indicating only the retransmitted CBG indicated by the first indicating field. Then the K bits of information corresponding to each CBG can further indicate which one of symbols occupied by data which were transmitted for the number N of times, of the CBG includes interrupted data.

In a second case, if the downlink control channel does not include any first indicating field, then the third indicating field above may further include an indicating field indicating which CBG is retransmitted, and for example, the indicating field may include A*M bits, where A is the number of TBs, M is the number of CBGs into which each TB is segmented, and each of the M bits corresponds to one of the CBGs; or the indicating field may include $\lceil \log_2^T \rceil$ bits corresponding to a CBG number, where T is the number of CBGs in which a TB is segmented, or the largest number of CBGs.

In a fifth situation, the third indicating field indicates which symbols among symbols occupied by data which were transmitted for the number N of times, of CBs in a CBG scheduled by the downlink control channel to be retransmitted, include interrupted data, particularly in two cases which are combinations of the two cases in the third situation, and the two cases in the fourth situation, and a repeated description thereof will be omitted here.

In the embodiment above, the third indicating field, and the retransmitted information carried in the shared channel is encoded separately; and/or the third indicating field can be transmitted over a resource corresponding to fixed CBG of the CBGs carried in the shared channel, through puncturing or rate matching. The third indicating field can be duplicatively encoded, simplex-encoded, Reed-Muller (RM)-encoded, etc.

FIG. 3 illustrates a transport channel process according to an embodiment of the application. As illustrated in FIG. 3, the transport channel process includes a first process for processing a Transport Block (TB): 301: adding a CRC to the TB; 302: segmenting the TB into CBs, and adding CRCs to the CBs respectively; 303: channel-encoding; 304: rate-matching; and 305: concatenating the CBs into CBGs according to CBG indexes. The transport channel process further includes a second process for processing the third indicating field: 306: generating the third indicating field; 307: rate-matching; 308: channel-encoding; 309: concatenating information obtained in the first process and the second process; 310: orthogonally amplitude-modulating; and 311: mapping onto a physical resource, etc. The information obtained in the first process and the second process can be concatenated in 309 to reflect a mapping relationship between the first indicating field, and the CBs in the CBGs corresponding to the first indicating field, that is, to include code blocks $CB_{1,1}$ 312, ..., $CB_{N1,1}$ 313, ..., $CB_{1,M}$ 314, ..., $CB_{NM,1}$ 315, where x in each CBx,y represents the number of the CB, and y represents the number of a CBG corresponding to the CB. For example, there is a third indicating field over a resource corresponding to the code block $CB_{1,1}$ 312.

In a particular implementation, the third indicating field can be transmitted over a resource corresponding to fixed CBG of CBGs carried in the shared channel, e.g., a resource corresponding to the first or last CBG, and particularly can be transmitted over a resource corresponding to fixed CBG of CBs in the first CBG, e.g., the first or last CB. For example, the third indicating field is transmitted over a resource corresponding to the first CB in the first CBG, e.g., the code block $CB_{1,1}$ 312 as illustrated in FIG. 3, and if it is transmitted in the resource corresponding to the CB through puncturing, then data of the CB will be transmitted regardless the size of the third indicating field, and the data will be encoded and rate-matched in such a way that the CB can be transmitted throughout the resource corresponding to the CB. When the third indicating field is mapped onto the resource corresponding to the data in the CB in reality, the data are punctured, i.e., covered. If the third indicating field is transmitted in the resource corresponding to the CB through rate matching, then the third indicating field, and the data of the CB over the resource corresponding to the CB will be encoded and rate-matched respectively, that is, the data of the CB, and the third indicating field are transmitted respectively in different components of the resource corresponding to the CB.

In the fourth approach, before the terminal obtains the third indicating field, the terminal determines whether the third indicating field exists, as follows: the terminal determines that the third indicating field exists, upon determining that the shared channel carries retransmission; or there is a fourth indicating field of at least one bit in the downlink control channel, where the fourth indicating field indicates whether the third indicating field exists in the shared channel.

In a particular implementation, when it is determined that the shared channel carries retransmission (as described above), the existence of the third indicating field can be determined in the following implementation without any limitation thereto: the existence of the third indicating field can be determined according to the downlink control channel scheduling retransmission, and for example, when the downlink control channel includes the first indicating field indicating that at least one CBG is retransmitted, it can be determined that the shared channel carries retransmission, so the existence of the third indicating field can be determined.

There is a fourth indicating field of at least one bit in the downlink control channel, where the fourth indicating field indicates whether the third indicating field exists in the shared channel, in the following implementation without any limitation thereto: for example, the downlink control channel includes a 1-bit fourth indicating field, and when it is set to "0", it indicates that the downlink control channel does not include any third indicating field; and when it is set to "1", it indicates that the downlink control channel includes the third indicating field. If the 1-bit fourth indicating field in the downlink control channel received by the terminal is "1", then it will be determined that the shared channel includes the third indicating field, so the third indicating field is received; and if the 1-bit fourth indicating field in the downlink control channel received by the terminal is "0", then it will be determined that the shared channel does not include any third indicating field.

If the terminal determines that the third indicating field exists in the downlink control channel, then it will determine whether the third indicating field includes more bits of indication information, as follows: the third indicating field includes at least one bit of indication information to indicate whether the third indicating field includes more bits of indication information. For example, when the 1-bit indication information in the third indicating field is set to "1", it indicates that the third indicating field includes more bits of indication information, and when the 1-bit indication information in the third indicating field is set to "0", it indicates that the third indicating field does not include any more bits of indication information; or when the 1-bit indication information in the third indicating field is set to "1", it indicates that the third indicating field does not include any more bits of indication information, and when the 1-bit indication information in the third indicating field is set to "0", it indicates that the third indicating field includes more bits of indication information.

The terminal firstly determines whether the third indicating field further includes other indication information, according to the 1-bit indication information in the third indicating field; when it is determined that there is not any other indication information, the third indicating field includes only the 1-bit indication information; and when it is determined that there is other indication information, the terminal receives the other indication information in the third indicating field according to the size of the third indicating field including the other indication information. It shall be noted that the 1-bit indication information and the other indication information in the third indicating field is encoded separately.

For example, a downlink control channel received by the terminal in a timeslot 1 includes a 1-bit fourth indicating field "0", so the terminal determines that the downlink control channel does not include any third indicating field, and receives an initially transmitted TB1 directly, where the TB1 includes a CBG1, a CBG2, a CBG3, and a CBG4. For example, a first indicating field in a downlink control channel in a timeslot 3 indicates that the CBG2 and the CBG4 are retransmitted; and the downlink control channel received by the terminal in the timeslot 3 to schedule a CBG in the TB1 to be retransmitted includes a 1-bit fourth indicating field "1", so the terminal determines that the downlink control channel includes a third indicating field, and receives the retransmitted CBG according to the third indicating field, and for example, if the retransmitted CBG indicated by the third indicating field was interrupted while being lastly transmitted, then the retransmitted CBG may not be merged with the lastly received interrupted CBG.

Particularly the terminal can receive the third indicating field according to a fixed number of bits in the third indicating field, or can firstly parse the third indicating field for 1-bit indication information, and decide whether to further receive another indicating field in the third indicating field, according to the indication information; and the terminal can determine which CBG in the lastly transmitted TB1 includes interrupted information, according to indication information in the received third indicating field, e.g., 4-bit indication information, where each bit corresponds to a CBG. If there are more bits of information, and for example, each CB corresponds to one of the bits, then the terminal may determine which CB in the lastly transmitted TB1 includes interrupted information, and if each transport symbol corresponds to a bit of information, then the terminal may determine which transport symbol in the lastly transmitted TB1 includes interrupted information.

If there is not any fourth indicating field in the downlink control channel, then the terminal will assume by default that there is a third indicating field transmitted in the shared channel, and for example, receive the third indicating field over a fixed resource in the first CBG by default.

Further to the embodiment above, processing of a received retransmitted data packet by the terminal will be described below.

When the terminal receives a retransmitted data packet, the buffer of the terminal can be searched for data packets which were transmitted for the number N of times, with the same HARQ process number as the retransmitted data packet, and if there are no interrupted data among the number N of times previous transmissions of the retransmitted data packet, then the terminal will HARQ-merge the retransmitted data packet with the data packets which were transmitted for the number N of times, in the buffer of the terminal upon reception of the retransmitted data packet.

The terminal does not HARQ-merge the retransmitted data packet with the received interrupted data among the data which were transmitted for the number N of times, of the retransmitted data packet upon determining that there are interrupted data. For example, if the retransmitted data packet is interrupted while being lastly transmitted, then the terminal will release the interrupted data among the lastly transmitted data, in the buffer in an implementation, or cover the lastly interrupted data with the currently received retransmitted data, although the embodiment of the application will not be limited to these two implementations.

For example, upon determining that there are interrupted data, the terminal can operate on the interrupted data as follows: for example, the terminal receives a downlink control channel in a timeslot 1 to schedule a TB1 to be initially transmitted in a shared channel, where an HARQ process number indicated in the downlink control channel is 0, that is, the HARQ process number corresponding to the TB1 is 0, and the TB is segmented by default into four CBGs including a CBG1, a CBG2, a CBG3, and a CBG4; and the terminal receives information of the retransmitted CBG2 and CBG4 in the shared channel in a timeslot 3, so the information of the retransmitted CBG2 and CBG4 is not merged with information of the initially transmitted CBG2 and CBG4, stored in the buffer, received in the timeslot 1; or the terminal clears the information of the CBG2 and the CBG4, stored in the buffer, received in the initially transmitted TB1 in the timeslot 1, and releases the buffer. In this way, the retransmitted data packet can be avoided from being affected by the interrupted data among the data which were transmitted for the number N of times, of the retransmitted data packet.

Second Embodiment

FIG. 4 illustrates a schematic flow chart of a method for determining whether data are interrupted according to a second embodiment of the application. As illustrated in FIG. 4, the method includes the following operations from the perspective of a base station.

In the operation 401, the base station transmits a downlink control channel to a terminal to schedule retransmission.

In the operation 402, the base station notifies the terminal using the downlink control channel about whether there are interrupted data among a number N of times previous transmissions of a retransmission data packet scheduled by the downlink control channel, where N is an integer more than or equal to 1.

In the embodiment of the application, the base station transmits the downlink control channel to the terminal so that the terminal determines whether there are interrupted data among the number N of times previous transmissions of the retransmission data packet scheduled by the downlink control channel, according to the downlink control channel, thus improving the transmission performance.

It shall be noted that the method according to the second embodiment of the application corresponds to the method according to the first embodiment of the application except that the process performed by the terminal has been described in details in the first embodiment of the application, and the process performed by the base station is described in the second embodiment of the application, so the second embodiment of the application will be focused on the process performed by the base station, and reference can be made to the description of the first embodiment of the application for other details thereof, so a repeated description thereof will be omitted here.

In an implementation, the data packet in the operation 402 can be one or more Transport Blocks (TBs), or can be one or more Code Block Groups (CBGs), that is, transmitted data in a TB can be retransmitted, or transmitted data in a code block group can be retransmitted.

In the embodiment of the application, the interrupted data can be a CBG or can be a CB, or can be a symbol occupied by a CBG.

After the base station transmits a data packet to the terminal, if a part or all of information of the data packet is punctured because a resource thereof is preempted by other transmission, that is, a part or all of the information is covered with other information, then the base station will transmit a downlink control channel to the terminal to schedule the data packet to be retransmitted, to thereby notify the terminal about whether there are interrupted data among the number N of times previous transmissions of the data packet scheduled by the downlink control channel to be retransmitted.

In an implementation, the downlink control channel includes a first indicating field indicating which Code Block Groups (CBGs) among CBGs into which an initially transmitted Transport Block (TB) is segmented are to be retransmitted in a shared channel scheduled by the downlink control channel. In this way, the first indicating field is added to the downlink control channel to thereby notify the terminal of those CBGs to be retransmitted in the shared channel.

Optionally the first indicating field exists or is valid particularly in the following instances: in a first instance, the first indicating field exists or is valid only in a downlink control channel scheduling retransmission, or in a second instance, the first indicating field exists or is valid when the terminal is configured to transmit data with CBGs; or in a third instance, the first indicating field exists or is valid in any downlink control channel. The description of the first indicating field in the second embodiment can refer to the description of the foregoing embodiment, and details will be omitted here.

In an implementation, the base station is such that the terminal to determine whether the downlink control channel is a downlink control channel scheduling retransmission, particularly according to a DCI format used for the downlink control channel, or an RNTI for the downlink control channel, or an HARQ process number and a new data indicating field in the downlink control channel; or when the downlink control channel includes the first indicating field indicating at least one CBG to be retransmitted, the terminal determines that the downlink control channel schedules retransmission.

In a particular implementation, the base station notifies the terminal using the downlink control channel about whether there are interrupted data among the number N of times previous transmissions of the retransmission data packet scheduled by the downlink control channel, in at least one of the following approaches.

In a first approach, before the terminal feeds back ACK/NACK information for the number N of times previous transmissions of the retransmission data packet scheduled by the downlink control channel, the base station transmits the downlink control channel to the terminal so that the terminal determines that there are interrupted data among the number N of times previous transmissions of the retransmission data packet scheduled by the downlink control channel.

In a second approach, the downlink control channel includes a second indicating field including 1-bit indication information, or 1-bit indication information for each TB scheduled by the downlink control channel to be transmitted in the same shared channel, where the second indicating field indicates whether there are interrupted data among the number N of times previous transmissions of the retransmission data packet scheduled by the downlink control channel.

In a third approach, the downlink control channel includes a second indicating field including M-bit indication information, or M-bit indication information for each TB scheduled by the downlink control channel to be transmitted in the same shared channel, where 1-bit in the M-bit indication information corresponds to one of CBGs into which an initially transmitted TB is segmented, and indicates whether there are interrupted data among the number N of times previous transmissions of the corresponding CBG, where M is an integer more than or equal to 1.

In a fourth approach, the base station transmits a shared channel scheduled by the downlink control channel, where the shared channel includes a third indicating field indicating whether there are interrupted data among the number N of times previous transmissions of the retransmission data packet scheduled by the downlink control channel.

It shall be noted that the first approach, the second approach, the third approach, and the fourth approach in this second embodiment of the application correspond to the first approach, the second approach, the third approach, and the fourth approach in the first embodiment of the application, and reference can be made to the description in the first embodiment of the application, so a repeated description thereof will be omitted here.

In this embodiment, when it is determined in the first approach or the second approach that there are interrupted data among the number N of times previous transmissions of the retransmission data packet scheduled by the downlink control channel, if the downlink control channel includes the first indicating field, then it will be determined that there are interrupted data among the number N of times previous transmissions of a CBG scheduled by the first indicating field in the downlink control channel to be retransmitted.

In this embodiment, in the second approach or the third approach, the second indicating field exists or is valid only in a downlink control channel scheduling retransmission; or the second indicating field exists or is valid when the terminal is configured to transmit data with CBGs; or the second indicating field exists or is valid in any downlink control channel.

In this embodiment, in the fourth approach, the third indicating field indicates whether there are interrupted data among the number N of times previous transmissions of the retransmission data packet scheduled by the downlink control channel, where the third indicating field indicates whether there are interrupted data among data which were transmitted for the number N of times, of each CBG among CBGs into which an initially transmitted TB is segmented, or whether there are interrupted data among the number N of times previous transmissions of a CBG scheduled by the downlink control channel to be retransmitted, or which CBs among CBs in a CBG scheduled by the downlink control channel to be retransmitted, which were transmitted for the number N of times include interrupted data, or which symbols among symbols occupied by data which were transmitted for the number N of times, of a CBG scheduled by the downlink control channel to be retransmitted, include interrupted data, or which symbols among symbols occupied by data which were transmitted for the number N of times, of CBs in a CBG scheduled by the downlink control channel to be retransmitted, include interrupted data.

The third indicating field, and the retransmitted information carried in the shared channel is encoded separately; and/or the third indicating field can be transmitted over a resource corresponding to fixed CBG of the CBGs carried in the shared channel, through puncturing or rate matching.

In the fourth approach, before the base station generates the third indicating field, the base station determines whether the third indicating field exists as follows: the base station determines that the third indicating field exists, upon determining that the shared channel carries retransmission; or determining, by the terminal, whether the third indicating field exists based on a fourth indicating field of at least one bit in the downlink control channel, where the fourth indicating field indicates whether the third indicating field exists in the shared channel, and the base station determines whether the third indicating field exists, and notifies the terminal using the fourth indicating field. In this way, the terminal determines whether the third indicating field exists according to information in the fourth indicating field.

Furthermore if the terminal determines that the third indicating field exists in the downlink control channel, then the base station will determine whether the third indicating field includes more bits of indication information, as follows: the third indicating field includes at least one bit of indication information to indicate whether the third indicating field includes more bits of indication information; and the base station determines whether the third indicating field includes more bits of indication information, and notifies the terminal using the 1-bit indication information.

In the embodiment of the application, the base station transmits a downlink control channel to the terminal, where the downlink control channel includes indication information indicating a retransmitted data packet, and can further include any one or more of the first indicating field, the second indicating field, the third indicating field, and the fourth indicating field, so that the terminal can determine whether there are interrupted data among the number N of times previous transmissions of the retransmitted data packet, according to the received downlink control channel, and can determine a subsequent operation, e.g., of clearing the interrupted data among the number N of times previous transmissions etc. In this embodiment, a particular implementation in which the terminal can determine whether there are interrupted data among the number N of times previous transmissions according to the downlink control channel transmitted by the base station to the terminal has been described in details in the first embodiment, so a repeated description thereof will be omitted.

It shall be noted that the embodiments above can be applicable to both downlink transmission and uplink transmission.

Figure 5:
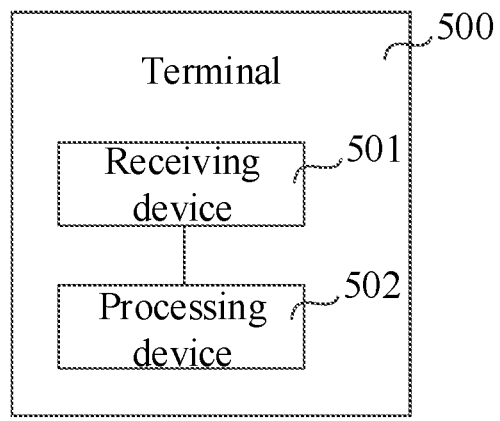
FIG. 5 is a schematic structural diagram of a terminal according to an embodiment of the application.

FIG. 5 illustrates a schematic structural diagram of a terminal according to an embodiment of the application.

Based upon the same inventive idea, an embodiment of the application provides a terminal for performing the method according to the first embodiment of the application; and as illustrated in FIG. 5, the terminal 500 includes a receiving device 501 and a processing device 502.

The receiving device 501 is configured to receive a downlink control channel transmitted by a base station to schedule retransmission.

The processing device 502 is configured to determine whether there are interrupted data among a number N of times previous transmissions of a retransmission data packet scheduled by the downlink control channel, according to the downlink control channel, where N is an integer more than or equal to 1.

In an implementation, the downlink control channel includes a first indicating field indicating which CBG among segmented CBGs of an initially transmitted TB is to be retransmitted in a shared channel scheduled by the downlink control channel.

Optionally the first indicating field exists or is valid only in a downlink control channel scheduling retransmission; or the first indicating field exists or is valid when the terminal is configured to transmit data with CBGs; or the first indicating field exists or is valid in any downlink control channel.

Optionally the processing device 502 configured to determine whether the downlink control channel is a downlink control channel scheduling retransmission is configured to determine whether the downlink control channel is a downlink control channel scheduling retransmission according to a DCI format used for the downlink control channel, or an RNTI for the downlink control channel, or an HARQ process number and a new data indicating field in the downlink control channel; or when the downlink control channel includes the first indicating field indicating at least one CBG to be retransmitted, to determine that the downlink control channel schedules retransmission.

Optionally the processing device 502 is configured to determine whether there are interrupted data among the number N of times previous transmissions of the retransmission data packet scheduled by the downlink control channel, according to the downlink control channel in at least one of the following approaches.

In a first approach, when the terminal receives the downlink control channel before ACK/NACK information feedback of the number N of times previous transmissions of the retransmission data packet scheduled by the downlink control channel, determining that there are interrupted data among the number N of times previous transmissions of the retransmission data packet scheduled by the downlink control channel.

In a second approach, the downlink control channel includes a second indicating field including 1-bit indication information, or 1-bit indication information for each TB scheduled by the downlink control channel to be transmitted in the same shared channel, where the second indicating field indicates whether there are interrupted data among the number N of times previous transmissions of the retransmission data packet scheduled by the downlink control channel.

In a third approach, the downlink control channel includes a second indicating field including M-bit indication information, or M-bit indication information for each TB scheduled by the downlink control channel to be transmitted in the same shared channel, where 1-bit in the M-bit indication information corresponds to one of CBGs into which an initially transmitted TB is segmented, and indicates whether there are interrupted data among the number N of times previous transmissions of the corresponding CBG, where M is an integer more than or equal to 1.

In a fourth approach, the receiving device 501 receives a shared channel scheduled by the downlink control channel, where the shared channel includes a third indicating field indicating whether there are interrupted data among the number N of times previous transmissions of the retransmission data packet scheduled by the downlink control channel.

Optionally when it is determined in the first approach or the second approach that there are interrupted data among the number N of times previous transmissions of the retransmission data packet scheduled by the downlink control channel, the processing device 502 is further configured: if the downlink control channel includes the first indicating field, to determine that there are interrupted data among the number N of times previous transmissions of a CBG scheduled by the first indicating field in the downlink control channel to be retransmitted.

Optionally in the second approach or the third approach, the second indicating field exists or is valid only in a downlink control channel scheduling retransmission; or the second indicating field exists or is valid when the terminal is configured to transmit data with CBGs; or the second indicating field exists or is valid in any downlink control channel.

Optionally in the fourth approach, the third indicating field indicates whether there are interrupted data among the number N of times previous transmissions of the retransmission data packet scheduled by the downlink control channel, where the third indicating field indicates whether there are interrupted data among the number N of times previous transmissions of each CBG among CBGs into which an initially transmitted TB is segmented, or whether there are interrupted data among the number N of times previous transmissions of a CBG scheduled by the downlink control channel to be retransmitted, or which Code Block (CB) has interruption within the number N of times previous transmissions of CBs in a CBG scheduled by the downlink control channel to be retransmitted, or which symbol has interruption within symbols occupied by the number N of times previous transmissions of a CBG scheduled by the downlink control channel to be retransmitted, or which symbols among symbols occupied by the number N of times previous transmissions of CBs in a CBG scheduled by the downlink control channel to be retransmitted.

Optionally the third indicating field, and the retransmitted information carried in the shared channel is encoded separately; and/or the third indicating field is transmitted over a resource corresponding to fixed CBG of the CBGs carried in the shared channel, through puncturing or rate matching.

Optionally in the fourth approach, the processing device 502 configured to determine whether the third indicating field exists is further configured: to determine that the third indicating field exists, upon determining that the shared channel carries retransmission; or determining, by the terminal, whether the third indicating field exists based on a fourth indicating field of at least one bit in the downlink control channel, where the fourth indicating field indicates whether the third indicating field exists in the shared channel; and when the terminal determines that the third indicating field exists, then the processing device 502 is further configured to determine whether the third indicating field includes more bits of indication information, where the third indicating field includes at least one bit of indication information to indicate whether the third indicating field includes more bits of indication information.

Optionally the processing device 502 is further configured, when it is determined that there are interrupted data, to clear the interrupted data within stored data of the number N of times previous transmissions of the retransmitted data packet, or to cover the interrupted data within stored data of the number N of times previous transmissions, of the retransmitted data packet with corresponding data in the retransmitted data packet.

As can be apparent from the description above, the terminal receives the downlink control channel transmitted by the base station to schedule retransmission, and determines whether there are interrupted data among the number N of times previous transmissions of the retransmission data packet scheduled by the downlink control channel, according to the downlink control channel, thus improving the transmission performance.

Figure 6:
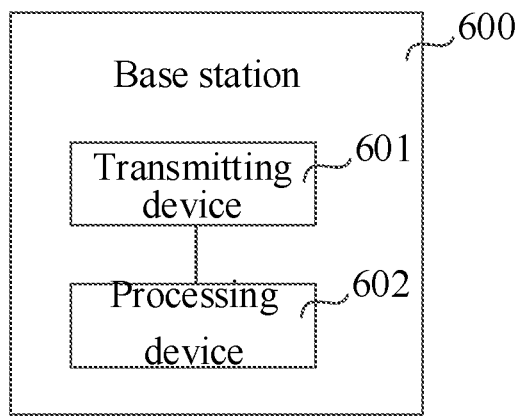
FIG. 6 is a schematic structural diagram of a base station according to an embodiment of the application.

FIG. 6 illustrates a schematic structural diagram of a base station according to an embodiment of the application.

Based upon the same inventive idea, an embodiment of the application provides a base station for performing the method according to the second embodiment of the application; and as illustrated in FIG. 6, the base station 600 includes a transmitting device 601 and a processing device 602.

The transmitting device 601 is configured to transmit a downlink control channel to a terminal to schedule retransmission.

The processing device 602 is configured to notify the terminal using the downlink control channel about whether there are interrupted data among a number N of times previous transmissions of a retransmission data packet scheduled by the downlink control channel, where N is an integer more than or equal to 1.

Optionally the downlink control channel includes a first indicating field indicating which CBGs among CBGs into which an initially transmitted TB is segmented are to be retransmitted in a shared channel scheduled by the downlink control channel.

Optionally the first indicating field exists or is valid only in a downlink control channel scheduling retransmission; or the first indicating field exists or is valid when the terminal is configured to transmit data with CBGs; or the first indicating field exists or is valid in any downlink control channel.

Optionally the processing device 602 configured to determine whether the downlink control channel is a downlink control channel scheduling retransmission is configured to determine whether the downlink control channel is a downlink control channel scheduling retransmission according to a DCI format used for the downlink control channel, or an RNTI for the downlink control channel, or an HARQ process number and a new data indicating field in the downlink control channel; or when the downlink control channel includes the first indicating field indicating at least one CBG to be retransmitted, to determine that the downlink control channel schedules retransmission.

Optionally the processing device 602 is configured to notify the terminal using the downlink control channel about whether there are interrupted data among the number N of times previous transmissions of the retransmission data packet scheduled by the downlink control channel, in at least one of the following approaches.

In a first approach, when the transmitting device 601 transmits the downlink control channel before ACK/NACK information is fed back for the number N of times previous transmissions of the retransmission data packet scheduled by the downlink control channel, the processing device 602 notifies the terminal that it is determined that there are interrupted data among the number N of times previous transmissions of the retransmission data packet scheduled by the downlink control channel.

In a second approach, the downlink control channel includes a second indicating field including 1-bit indication information, or 1-bit indication information for each TB scheduled by the downlink control channel to be transmitted in the same shared channel, where the second indicating field indicates whether there are interrupted data among the number N of times previous transmissions of the retransmission data packet scheduled by the downlink control channel.

In a third approach, the downlink control channel includes a second indicating field including M-bit indication information, or M-bit indication information for each TB scheduled by the downlink control channel to be transmitted in the same shared channel, where 1-bit in the M-bit indication information corresponds to one of CBGs into which an initially transmitted TB is segmented, and indicates whether there are interrupted data among the number N of times previous transmissions of the corresponding CBG, where M is an integer more than or equal to 1.

In a fourth approach, the transmitting device 601 transmits a shared channel scheduled by the downlink control channel, where the shared channel includes a third indicating field indicating whether there are interrupted data among the number N of times previous transmissions of the retransmission data packet scheduled by the downlink control channel.

Optionally when it is determined in the first approach or the second approach that there are interrupted data among the number N of times previous transmissions of the retransmission data packet scheduled by the downlink control channel, the processing device 602 is further configured, if the downlink control channel includes the first indicating field, to notify the terminal that it is determined there are interrupted data among the number N of times previous transmissions of a CBG scheduled by the first indicating field in the downlink control channel to be retransmitted.

Optionally in the second approach or the third approach, the second indicating field exists or is valid only in a downlink control channel scheduling retransmission; or the second indicating field exists or is valid when the terminal is configured to transmit data with CBGs; or the second indicating field exists or is valid in any downlink control channel.

Optionally in the fourth approach, the third indicating field indicates whether there are interrupted data among the number N of times previous transmissions of the retransmission data packet scheduled by the downlink control channel, where the third indicating field indicates whether there are interrupted data among the number N of times previous transmissions of each CBG among CBGs into which an initially transmitted TB is segmented, or whether there are interrupted data among the number N of times previous transmissions of a CBG scheduled by the downlink control channel to be retransmitted, or which CBs among CBs in a CBG scheduled by the downlink control channel to be retransmitted, which were transmitted for the number N of times include interrupted data, or which symbols among symbols occupied by data which were transmitted for the number N of times, of a CBG scheduled by the downlink control channel to be retransmitted, include interrupted data, or which symbols among symbols occupied by data which were transmitted for the number N of times, of CBs in a CBG scheduled by the downlink control channel to be retransmitted, include interrupted data.

Optionally the third indicating field, and the retransmitted information carried in the shared channel is encoded separately; and/or the third indicating field can be transmitted over a resource corresponding to fixed CBG of the CBGs carried in the shared channel, through puncturing or rate matching.

Optionally in the fourth approach, the processing device 602 configured to determine that the third indicating field exists is further configured: to determine that the third indicating field exists, upon determining that the shared channel carries retransmission; or to determine whether the third indicating field exists based on a fourth indicating field of at least one bit in the downlink control channel, where the fourth indicating field indicates whether the third indicating field exists in the shared channel, to determine whether the third indicating field exists, and to notify the terminal using the fourth indicating field; and if the it is determined that the third indicating field exists, then the processing device 602 configured to determine whether the third indicating field includes more bits of indication information is further configured: when the third indicating field includes at least one bit of indication information to indicate whether the third indicating field includes more bits of indication information, to determine whether the third indicating field includes more bits of indication information, and to notify the terminal using the 1-bit indication information.

Figure 7:
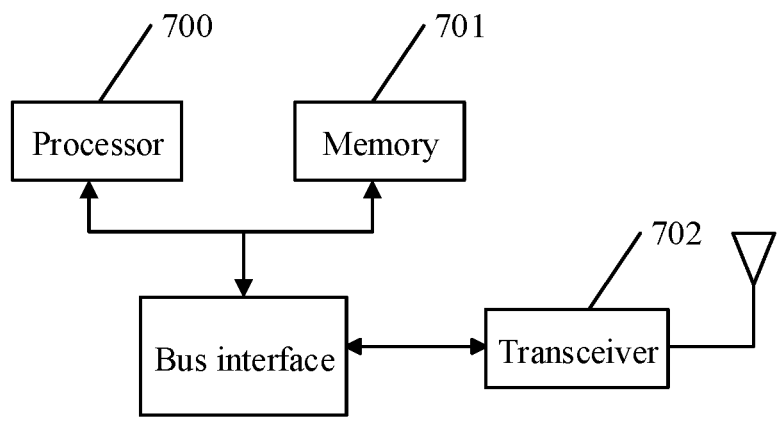
FIG. 7 is a schematic structural diagram of a terminal according to an embodiment of the application.

As illustrated in FIG. 7, a terminal according to an embodiment of the application includes: a processor 700, a memory 701, and a transceiver 702.

The processor 700 is responsible for managing a bus architecture and performing normal processes, and the memory 702 can store data for use by the processor 700 in performing operations. The transceiver 702 is configured to transmit and receive data under the control of the processor 700.

The bus architecture can include any number of interconnecting buses and bridges to link together various circuits including one or more processors represented by the processor 700, and one or more memories represented by the memory 701. The bus architecture can further link together various other circuits, e.g., a peripheral device, a manostat, a power management circuit, etc., all of which are well known in the art, so a further description thereof will be omitted in this context. A bus interface serves as an interface. The processor 700 is responsible for managing the bus architecture and performing normal processes, and the memory 702 can store data for use by the processor 700 in performing operations.

The flow according to the embodiment of the application can be applicable to the processor 700, or performed by the processor 700. In an implementation, the respective operations in the flow can be performed by integrated logic circuits in hardware, or instructions in software, in the processor 700. The processor 700 can be a general-purpose processor, a digital signal processor, an application specific integrated circuit, a field programmable gate array, or another programmable logic device, discrete gate, transistor logic device, or discrete hardware component. The respective methods, operations, and logic block diagrams disclosed in the embodiments of the application can be implemented or performed. The general-purpose processor can be a micro processor, or can be any conventional processor, etc. The operations in the method according to the embodiment of the application can be performed directly by a hardware processor, or performed by a combination of hardware and software modules in the processor. The software module can be located in a random memory, a flash memory, a read-only memory, a programmable read-only memory, an electrically erasable and programmable memory, a register, or another storage medium known in the art. The storage medium is located in the memory 701, and the processor 700 reads the information in the memory 700, and performs the operations in the flow with the hardware thereof.

Particularly the processor 700 is configured to read and execute program in the memory 701: to receive a downlink control channel transmitted by a base station to schedule retransmission; and to determine whether there are interrupted data among a number N of times previous transmissions of a retransmission data packet scheduled by the downlink control channel, according to the downlink control channel, where N is an integer more than or equal to 1.

Optionally the downlink control channel includes a first indicating field indicating which Code Block Group (CBG) among segmented CBGs of an initially transmitted Transport Block (TB) is to be retransmitted in a shared channel scheduled by the downlink control channel.

Optionally the first indicating field exists or is valid only in a downlink control channel scheduling retransmission; or the first indicating field exists or is valid when the terminal is configured to transmit data with CBGs; or the first indicating field exists or is valid in any downlink control channel.

Optionally the processor 700 configured to determine whether the downlink control channel is a downlink control channel scheduling retransmission is configured: to determine whether the downlink control channel is a downlink control channel scheduling retransmission according to a Downlink Control Information (DCI) format used for the downlink control channel; or to determine whether the downlink control channel is a downlink control channel scheduling retransmission according to a Radio Network Temporary Identity (RNTI) used for the downlink control channel; or to determine whether the downlink control channel is a downlink control channel scheduling retransmission according to a Hybrid Automatic Repeat reQuest (HARQ) process number and a new data indicating field in the downlink control channel; or when the downlink control channel includes the first indicating field indicating at least one CBG to be retransmitted, to determine that the downlink control channel schedules retransmission.

Optionally the processor 700 is configured to determine whether there are interrupted data among the number N of times previous transmissions of the retransmission data packet scheduled by the downlink control channel, according to the downlink control channel in at least one of the following approaches.

In a first approach, when the terminal receives the downlink control channel before ACK/NACK information feedback of the number N of times previous transmissions of the retransmission data packet scheduled by the downlink control channel, determining that there are interrupted data among the number N of times previous transmissions of the retransmission data packet scheduled by the downlink control channel.

In a second approach, the downlink control channel includes a second indicating field including 1-bit indication information, or 1-bit indication information for each TB scheduled by the downlink control channel to be transmitted in the same shared channel, where the second indicating field indicates whether there are interrupted data among the number N of times previous transmissions of the retransmission data packet scheduled by the downlink control channel.

In a third approach, the downlink control channel includes a second indicating field including M-bit indication information, or M-bit indication information for each TB scheduled by the downlink control channel to be transmitted in the same shared channel, where 1-bit in the M-bit indication information corresponds to one of CBGs into which an initially transmitted TB is segmented, and indicates whether there are interrupted data among the number N of times previous transmissions of the corresponding CBG, where M is an integer more than or equal to 1.

In a fourth approach, the terminal receives a shared channel scheduled by the downlink control channel, where the shared channel includes a third indicating field indicating whether there are interrupted data among the number N of times previous transmissions of the retransmission data packet scheduled by the downlink control channel.

Optionally when it is determined in the first approach or the second approach that there are interrupted data among the number N of times previous transmissions of the retransmission data packet scheduled by the downlink control channel, the processor 700 is further configured: if the downlink control channel includes the first indicating field, to determine that there are interrupted data among the number N of times previous transmissions of a CBG scheduled by the first indicating field in the downlink control channel to be retransmitted.

Optionally in the second approach or the third approach, the second indicating field exists or is valid only in a downlink control channel scheduling retransmission; or the second indicating field exists or is valid when the terminal is configured to transmit data with CBGs; or the second indicating field exists or is valid in any downlink control channel.

Optionally in the fourth approach, the third indicating field indicates whether there are interrupted data among the number N of times previous transmissions of the retransmission data packet scheduled by the downlink control channel.

The third indicating field indicates whether there are interrupted data among the number N of times previous transmissions of each CBG among CBGs into which an initially transmitted TB is segmented, or whether there are interrupted data among the number N of times previous transmissions of a CBG scheduled by the downlink control channel to be retransmitted, or which Code Block (CB) has interruption within the number N of times previous transmissions of CBs in a CBG scheduled by the downlink control channel to be retransmitted, or which symbol has interruption within symbols occupied by the number N of times previous transmissions of a CBG scheduled by the downlink control channel to be retransmitted, or which symbols among symbols occupied by the number N of times previous transmissions of CBs in a CBG scheduled by the downlink control channel to be retransmitted.

Optionally the third indicating field, and the retransmitted information carried in the shared channel is encoded separately; and/or the third indicating field can be transmitted over a resource corresponding to fixed CBG of the CBGs carried in the shared channel, through puncturing or rate matching.

Optionally in the fourth approach, the processor 700 configured to determine whether the third indicating field exists is further configured: to determine that the third indicating field exists, upon determining that the shared channel carries retransmission; or determining, by the terminal, whether the third indicating field exists based on a fourth indicating field of at least one bit in the downlink control channel, where the fourth indicating field indicates whether the third indicating field exists in the shared channel; and if the terminal determines that the third indicating field exists, then the processor 700 is further configured to determine whether the third indicating field includes more bits of indication information, where: the third indicating field includes at least one bit of indication information to indicate whether the third indicating field includes more bits of indication information.

Optionally the processor 700 is further configured: when it is determined that there are interrupted data, to clear the interrupted data within stored data of the number N of times previous transmissions of the retransmitted data packet, or to cover the interrupted data within stored data of the number N of times previous transmissions of the retransmitted data packet with corresponding data in the retransmitted data packet.

Figure 8:
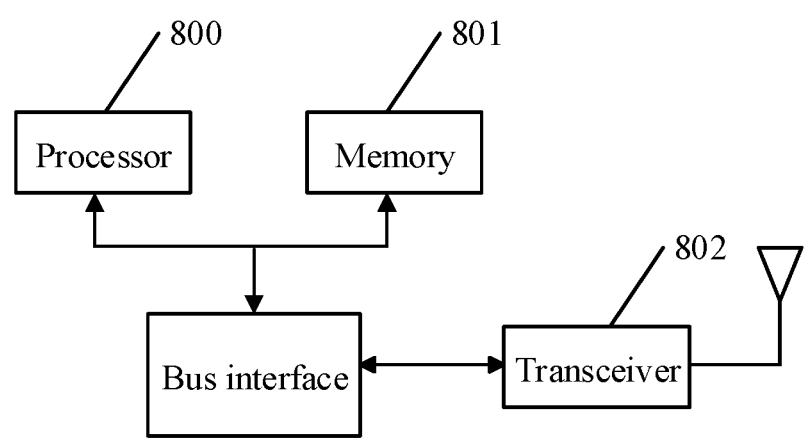
FIG. 8 is a schematic structural diagram of a base station according to an embodiment of the application.

As illustrated in FIG. 8, a base station according to the embodiments of the application includes: a processor 800, a memory 801, and a transceiver 802.

The processor 800 is responsible for managing a bus architecture and performing normal processes, and the memory 802 can store data for use by the processor 800 in performing operations. The transceiver 802 is configured to transmit and receive data under the control of the processor 800.

The bus architecture can include any number of interconnecting buses and bridges to link together various circuits including one or more processors represented by the processor 800, and one or more memories represented by the memory 801. The bus architecture can further link together various other circuits, e.g., a peripheral device, a manostat, a power management circuit, etc., all of which are well known in the art, so a further description thereof will be omitted in this context. A bus interface serves as an interface. The processor 800 is responsible for managing the bus architecture and performing normal processes, and the memory 802 can store data for use by the processor 800 in performing operations.

The flow according to the embodiment of the application can be applicable to the processor 800, or performed by the processor 800. In an implementation, the respective operations in the flow can be performed by integrated logic circuits in hardware, or instructions in software, in the processor 800. The processor 800 can be a general-purpose processor, a digital signal processor, an application specific integrated circuit, a field programmable gate array, or another programmable logic device, discrete gate, transistor logic device, or discrete hardware component. The respective methods, operations, and logic block diagrams disclosed in the embodiments of the application can be implemented or performed. The general-purpose processor can be a micro processor, or can be any conventional processor, etc. The operations in the method according to the embodiment of the application can be performed directly by a hardware processor, or performed by a combination of hardware and software modules in the processor. The software module can be located in a random memory, a flash memory, a read-only memory, a programmable read-only memory, an electrically erasable and programmable memory, a register, or another storage medium known in the art. The storage medium is located in the memory 801, and the processor 800 reads the information in the memory 801, and performs the operations in the flow with the hardware thereof.

Particularly the processor 800 is configured to read and execute program in the memory 801: to transmit a downlink control channel to a terminal to schedule retransmission; and to notify the terminal using the downlink control channel about whether there are interrupted data among the number N of times previous transmissions of the retransmission data packet scheduled by the downlink control channel, where N is an integer equal to or more than 1.

Optionally the downlink control channel includes a first indicating field indicating which CBGs among CBGs into which an initially transmitted TB is segmented are to be retransmitted in a shared channel scheduled by the downlink control channel.

Optionally the first indicating field exists or is valid particularly in the following instances: in a first instance, the first indicating field exists or is valid only in a downlink control channel scheduling retransmission, or in a second instance, the first indicating field exists or is valid when the terminal is configured to transmit data with CBGs; or in a third instance, the first indicating field exists or is valid in any downlink control channel.

Optionally the processor 800 configured to determine whether the downlink control channel is a downlink control channel scheduling retransmission is configured: to determine whether the downlink control channel is a downlink control channel scheduling retransmission according to a Downlink Control Information (DCI) format used for the downlink control channel; or to determine whether the downlink control channel is a downlink control channel scheduling retransmission according to a Radio Network Temporary Identity (RNTI) used for the downlink control channel; or to determine whether the downlink control channel is a downlink control channel scheduling retransmission according to a Hybrid Automatic Repeat reQuest (HARQ) process number and a new data indicating field in the downlink control channel; or when the downlink control channel includes the first indicating field indicating at least one CBG to be retransmitted, to determine that the downlink control channel schedules retransmission.

Optionally the processor 800 is configured to notify the terminal using the downlink control channel about whether there are interrupted data among the number N of times previous transmissions of the retransmission data packet scheduled by the downlink control channel, in at least one of the following approaches.

In a first approach, when the base station transmits the downlink control channel before ACK/NACK information is fed back for the number N of times previous transmissions of the retransmission data packet scheduled by the downlink control channel, the processor 800 notifies the terminal that it is determined that there are interrupted data among the number N of times previous transmissions of the retransmission data packet scheduled by the downlink control channel.

In a second approach, the downlink control channel includes a second indicating field including 1-bit indication information, or 1-bit indication information for each TB scheduled by the downlink control channel to be transmitted in the same shared channel, where the second indicating field indicates whether there are interrupted data among the number N of times previous transmissions of the retransmission data packet scheduled by the downlink control channel.

In a third approach, the downlink control channel includes a second indicating field including M-bit indication information, or M-bit indication information for each TB scheduled by the downlink control channel to be transmitted in the same shared channel, where 1-bit in the M-bit indication information corresponds to one of CBGs into which an initially transmitted TB is segmented, and indicates whether there are interrupted data among the number N of times previous transmissions of the corresponding CBG, where M is an integer more than or equal to 1.

In a fourth approach, the base station transmits a shared channel scheduled by the downlink control channel, where the shared channel includes a third indicating field indicating whether there are interrupted data among the number N of times previous transmissions of the retransmission data packet scheduled by the downlink control channel.

Optionally when it is determined in the first approach or the second approach that there are interrupted data among the number N of times previous transmissions of the retransmission data packet scheduled by the downlink control channel, the processor 800 is further configured, if the downlink control channel includes the first indicating field, to notify the terminal that it is determined there are interrupted data among the number N of times previous transmissions of a CBG scheduled by the first indicating field in the downlink control channel to be retransmitted.

Optionally in the second approach or the third approach, the second indicating field exists or is valid only in a downlink control channel scheduling retransmission; or the second indicating field exists or is valid when the terminal is configured to transmit data with CBGs; or the second indicating field exists or is valid in any downlink control channel.

Optionally in the fourth approach, the third indicating field indicates whether there are interrupted data among the number N of times previous transmissions of the retransmission data packet scheduled by the downlink control channel.

The third indicating field indicates whether there are interrupted data among the number N of times previous transmissions of each CBG among CBGs into which an initially transmitted TB is segmented, or whether there are interrupted data among the number N of times previous transmissions of a CBG scheduled by the downlink control channel to be retransmitted, or which Code Block (CB) has interruption within the number N of times previous transmissions of CBs in a CBG scheduled by the downlink control channel to be retransmitted, or which symbol has interruption within symbols occupied by the number N of times previous transmissions of a CBG scheduled by the downlink control channel to be retransmitted, or which symbols among symbols occupied by the number N of times previous transmissions of CBs in a CBG scheduled by the downlink control channel to be retransmitted.

Optionally the third indicating field, and the retransmitted information carried in the shared channel is encoded separately; and/or the third indicating field can be transmitted over a resource corresponding to fixed CBG of the CBGs carried in the shared channel, through puncturing or rate matching.

Optionally in the fourth approach, the processor 800 configured to determine that the third indicating field exists is further configured: to determine that the third indicating field exists, upon determining that the shared channel carries retransmission; or determining, by the terminal, whether the third indicating field exists based on a fourth indicating field of at least one bit in the downlink control channel, where the fourth indicating field indicates whether the third indicating field exists in the shared channel, to determine whether the third indicating field exists, and to notify the terminal using the fourth indicating field; and if the it is determined that the third indicating field exists, then the processor 800 configured to determine whether the third indicating field includes more bits of indication information is further configured: when the third indicating field includes at least one bit of indication information to indicate whether the third indicating field includes more bits of indication information, to determine whether the third indicating field includes more bits of indication information, and to notify the terminal using the 1-bit indication information.

An embodiment of the application provides a readable storage medium, which is a nonvolatile storage medium, including program codes configured, upon being executed on a computing device, to cause the computing device to perform the operations of the terminal above.

An embodiment of the application provides a readable storage medium, which is a nonvolatile storage medium, including program codes configured, upon being executed on a computing device, to cause the computing device to perform the operations of the base station above.

As can be apparent from the description above, the base station transmits a downlink control channel to the terminal so that the terminal determines whether there are interrupted data among the number N of times previous transmissions of the retransmission data packet scheduled by the downlink control channel, according to the downlink control channel, thus improving the transmission performance.

Those skilled in the art shall appreciate that the embodiments of the application can be embodied as a method, a system or a computer program product. Therefore the application can be embodied in the form of an all-hardware embodiment, an all-software embodiment or an embodiment of software and hardware in combination. Furthermore the application can be embodied in the form of a computer program product embodied in one or more computer useable storage mediums (including but not limited to a disk memory, a CD-ROM, an optical memory, etc.) in which computer useable program codes are contained.

The application has been described in a flow chart and/or a block diagram of the method, the device (system) and the computer program product according to the embodiments of the application. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the embodiments of the application have been described, those skilled in the art benefiting from the underlying inventive concept can make additional modifications and variations to these embodiments. Therefore the appended claims are intended to be construed as encompassing the embodiments and all the modifications and variations coming into the scope of the application.

Evidently those skilled in the art can make various modifications and variations to the application without departing from the spirit and scope of the application. Thus the application is also intended to encompass these modifications and variations thereto so long as the modifications and variations come into the scope of the claims appended to the application and their equivalents.

What is claimed is:

1. A method for determining whether data are interrupted, the method comprising:

receiving, by a terminal, a downlink control channel transmitted by a base station to schedule retransmission; and determining, by the terminal, whether there are interrupted data among earlier N received transmissions of a retransmission data packet scheduled by the downlink control channel, according to the downlink control channel, wherein N is an integer more than or equal to 1;

wherein the determining, by the terminal, whether there are interrupted data among the earlier N received transmissions of the retransmission data packet scheduled by the downlink control channel, according to the downlink control channel is performed in any one of the following approaches:

in a first approach, when the terminal receives the downlink control channel before feeding back Acknowledgement/Non-Acknowledgement, ACK/NACK, information for the earlier N received transmissions of the retransmission data packet scheduled by the downlink control channel, the terminal determines that there are interrupted data among the earlier N received transmissions of the retransmission data packet scheduled by the downlink control channel; wherein the first approach further comprises: when the downlink control channel comprises a first indicating field, determining, by the terminal, that there are interrupted data among the earlier N received transmissions of a CBG scheduled by the first indicating field in the downlink control channel to be retransmitted;

in a second approach, the downlink control channel comprises a second indicating field, wherein the second indicating field comprises 1-bit indication information, or 1-bit indication information for each TB scheduled by the downlink control channel to be transmitted in the same shared channel, wherein the second indicating field indicates whether there are interrupted data among the earlier N received transmissions of the retransmission data packet scheduled by the downlink control channel, wherein the second indicating field exists or is valid only in a downlink control channel scheduling retransmission; or the second indicating field exists or is valid when the terminal is configured to transmit data with CBGs; or the second indicating field exists or is valid in any downlink control channel;

wherein the second approach further comprises: when the downlink control channel comprises a first indicating field, determining, by the terminal, that there are interrupted data among the earlier N received transmissions of a CBG scheduled by the first indicating field in the downlink control channel to be retransmitted;

in a third approach, the downlink control channel comprises a second indicating field, wherein the second indicating field comprises M-bit indication information for each TB of a plurality of TBs scheduled by the downlink control channel to be transmitted in the same shared channel, wherein 1-bit in the M-bit indication information corresponds to one of CBGs into which an initially transmitted TB is segmented, and indicates whether there are interrupted data among the earlier N received transmissions of the corresponding CBG, wherein M is an integer more than or equal to 1; wherein the second indicating field exists or is valid only in a downlink control channel scheduling retransmission; or the second indicating field exists or is valid when the terminal is configured to transmit data with CBGs; or the second indicating field exists or is valid in any downlink control channel; and in a fourth approach, the terminal receives a shared channel scheduled by the downlink control channel, wherein the shared channel comprises a third indicating field, and the third indicating field indicates whether there are interrupted data among the earlier N received transmissions of the retransmission data packet scheduled by the downlink control channel, wherein the third indicating field indicating whether there are interrupted data among the earlier N received transmissions of the retransmission data packet scheduled by the downlink control channel, comprises: the third indicating field indicating: whether there are interrupted data among the earlier N received transmissions of each CBG among CBGs into which an initially transmitted TB is segmented, or whether there are interrupted data among the earlier N received transmissions of a CBG scheduled by the downlink control channel to be retransmitted, or which Code Block (CB) has interruption within the earlier N received transmissions of CBs in a CBG scheduled by the downlink control channel to be retransmitted, or which symbol has interruption within symbols occupied by the number of times previous transmissions, of a CBG scheduled by the downlink control channel to be retransmitted, or which symbols among symbols occupied by the earlier N received transmissions of CBs in a CBG scheduled by the downlink control channel to be retransmitted.

2. The method according to claim 1, wherein the downlink control channel comprises a first indicating field, wherein the first indicating field indicates which Code Block Group (CBG), among segmented CBGs of an initially transmitted Transport Block (TB), is to be retransmitted in a shared channel scheduled by the downlink control channel;

wherein the first indicating field exists or is valid only in a downlink control channel scheduling retransmission; or the first indicating field exists or is valid when the terminal is configured to transmit data with CBGs; or the first indicating field exists or is valid in any downlink control channel.

3. The method according to claim 1, wherein the terminal determines whether the downlink control channel is a downlink control channel scheduling retransmission as follows:

the terminal determines whether the downlink control channel is a downlink control channel scheduling retransmission according to a Downlink Control Information (DCI) format used for the downlink control channel; or the terminal determines whether the downlink control channel is a downlink control channel scheduling retransmission according to a Radio Network Temporary Identity (RNTI) used for the downlink control channel; or the terminal determines whether the downlink control channel is a downlink control channel scheduling retransmission according to a Hybrid Automatic Repeat reQuest (HARD) process number and a new data indicating field in the downlink control channel; or when the downlink control channel comprises a first indicating field indicating at least one CBG to be retransmitted, the terminal determines that the downlink control channel schedules retransmission.

4. The method according to claim 1, wherein when the terminal determines that there are interrupted data, the terminal clears the interrupted data, or the terminal replaces the interrupted data with corresponding data in the retransmitted data packet.

5. A method for determining whether data are interrupted, the method comprising:
   transmitting, by a base station, a downlink control channel to a terminal to schedule retransmission; and
   notifying, by the base station, the terminal using the downlink control channel about whether there are interrupted data among earlier N received transmissions of a retransmission data packet scheduled by the downlink control channel, wherein N is an integer more than or equal to 1;
   wherein the base station notifies the terminal using the downlink control channel about whether there are interrupted data among the earlier N received transmissions of the retransmission data packet scheduled by the downlink control channel, in any one of the following approaches:
   in a first approach, when the base station transmits the downlink control channel before feeding back Acknowledgement/Non-Acknowledgement, ACK/NACK, information for the earlier N received transmissions of the retransmission data packet scheduled by the downlink control channel, the base station notifies the terminal that it is determined that there are interrupted data among the earlier N received transmissions of the retransmission data packet scheduled by the downlink control channel, wherein the first approach further comprises when the downlink control channel comprises a first indicating field, notifying the terminal that it is determined there are interrupted data among the earlier N received transmissions of a CBG scheduled by the first indicating field in the downlink control channel to be retransmitted;
   in a second approach, the downlink control channel comprises a second indicating field, wherein the second indicating field comprises 1-bit indication information, or 1-bit indication information for each TB scheduled by the downlink control channel to be transmitted in the same shared channel, wherein the second indicating field indicates whether there are interrupted data among the earlier N received transmissions of the retransmission data packet scheduled by the downlink control channel, wherein the second indicating field exists or is valid only in a downlink control channel scheduling retransmission; or the second indicating field exists or is valid when the terminal is configured to transmit data with CBGs; or the second indicating field exists or is valid in any downlink control channel;
   the second approach further comprises: when the downlink control channel comprises a first indicating field, notifying the terminal that it is determined there are interrupted data among the earlier N received transmissions of a CBG scheduled by the first indicating field in the downlink control channel to be retransmitted;
   in a third approach, the downlink control channel comprises a second indicating field, wherein the second indicating field comprises M-bit indication information for each TB of a plurality of TBs scheduled by the downlink control channel to be transmitted in the same shared channel, wherein 1-bit in the M-bit indication information corresponds to one of CBGs into which an initially transmitted TB is segmented, and indicates whether there are interrupted data among the earlier N received transmissions of the corresponding CBG, wherein M is an integer more than or equal to 1; wherein the second indicating field exists or is valid only in a downlink control channel scheduling retransmission; or the second indicating field exists or is valid when the terminal is configured to transmit data with CBGs; or the second indicating field exists or is valid in any downlink control channel; and
   in a fourth approach, the base station transmits a shared channel scheduled by the downlink control channel, wherein the shared channel comprises a third indicating field, and the third indicating field indicates whether there are interrupted data among the earlier N received transmissions of the retransmission data packet scheduled by the downlink control channel, wherein the third indicating field indicating whether there are interrupted data among the earlier N received transmissions of the retransmission data packet scheduled by the downlink control channel, comprises: the third indicating field indicating: whether there are interrupted data among the earlier N received transmissions of each CBG among CBGs into which an initially transmitted TB is segmented, or whether there are interrupted data among the earlier N received transmissions of a CBG scheduled by the downlink control channel to be retransmitted, or which Code Block (CB) has interruption within the earlier N received transmissions of CBs in a CBG scheduled by the downlink control channel to be retransmitted, or which symbol has interruption within symbols occupied by the number of times previous transmissions, of a CBG scheduled by the downlink control channel to be retransmitted, or which symbols among symbols occupied by the earlier N received transmissions of CBs in a CBG scheduled by the downlink control channel to be retransmitted.

6. The method according to claim 5, wherein the downlink control channel comprises a first indicating field, wherein the first indicating field indicates which Code Block Group (CBG), among segmented CBGs of an initially transmitted Transport Block (TB), is to be retransmitted in a shared channel scheduled by the downlink control channel;
   wherein the first indicating field exists or is valid only in a downlink control channel scheduling retransmission; or the first indicating field exists or is valid when the terminal is configured to transmit data with CBGs; or the first indicating field exists or is valid in any downlink control channel.

7. The method according to claim 5, wherein determining whether the downlink control channel is a downlink control channel scheduling retransmission comprises:
   determining whether the downlink control channel is a downlink control channel scheduling retransmission according to a Downlink Control Information (DCI) format used for the downlink control channel; or
   determining whether the downlink control channel is a downlink control channel scheduling retransmission according to a Radio Network Temporary Identity (RNTI) used for the downlink control channel; or determining whether the downlink control channel is a downlink control channel scheduling retransmission according to a Hybrid Automatic Repeat reQuest (HARD) process number and a new data indicating field in the downlink control channel; or when the downlink control channel comprises a first indicating field indicating at least one CBG to be retransmitted, determining that the downlink control channel schedules retransmission.

8. A terminal, comprising: a processor and a memory, wherein:

the processor is configured to read and execute program in the memory:

to receive a downlink control channel transmitted by a base station to schedule retransmission; and to determine whether there are interrupted data among earlier N received transmissions of a retransmission data packet scheduled by the downlink control channel, according to the downlink control channel, wherein N is an integer more than or equal to 1;

wherein the processor is further configured to read and execute program in the memory to determine whether there are interrupted data among the earlier N received transmissions of the retransmission data packet scheduled by the downlink control channel, according to the downlink control channel in any one of the following approaches:

in a first approach, when the terminal receives the downlink control channel before feeding back Acknowledgement/Non-Acknowledgement, ACK/NACK, information for the earlier N received transmissions of the retransmission data packet scheduled by the downlink control channel, determining that there are interrupted data among the earlier N received transmissions of the retransmission data packet scheduled by the downlink control channel; wherein the first approach further comprises when the downlink control channel comprises a first indicating field, determining that there are interrupted data among the earlier N received transmissions of a CBG scheduled by the first indicating field in the downlink control channel to be retransmitted;

in a second approach, the downlink control channel comprises a second indicating field, wherein the second indicating field comprises 1-bit indication information, or 1-bit indication information for each TB scheduled by the downlink control channel to be transmitted in the same shared channel, wherein the second indicating field indicates whether there are interrupted data among the earlier N received transmissions of the retransmission data packet scheduled by the downlink control channel, wherein the second indicating field exists or is valid only in a downlink control channel scheduling retransmission; or the second indicating field exists or is valid when the terminal is configured to transmit data with CBGs; or the second indicating field exists or is valid in any downlink control channel;

wherein the processor is further configured: when the downlink control channel comprises a first indicating field, to determine that there are interrupted data among the earlier N received transmissions of a CBG scheduled by the first indicating field in the downlink control channel to be retransmitted;

in a third approach, the downlink control channel comprises a second indicating field, wherein the second indicating field comprises M-bit indication information for each TB of a plurality of TBs scheduled by the downlink control channel to be transmitted in the same shared channel, wherein 1-bit in the M-bit indication information corresponds to one of CBGs into which an initially transmitted TB is segmented, and indicates whether there are interrupted data among the earlier N received transmissions of the corresponding CBG, wherein M is an integer more than or equal to 1; wherein the second indicating field exists or is valid only in a downlink control channel scheduling retransmission; or the second indicating field exists or is valid when the terminal is configured to transmit data with CBGs; or the second indicating field exists or is valid in any downlink control channel; and in a fourth approach, the processor is further configured to receive a shared channel scheduled by the downlink control channel, wherein the shared channel comprises a third indicating field, and the third indicating field indicates whether there are interrupted data among the earlier N received transmissions of the retransmission data packet scheduled by the downlink control channel, wherein the third indicating field indicating whether there are the earlier N received transmissions of the retransmission data packet scheduled by the downlink control channel interrupted data among the earlier N received transmissions of the retransmission data packet scheduled by the downlink control channel, comprises: the third indicating field indicating: whether there are interrupted data among the earlier N received transmissions of each CBG among CBGs into which an initially transmitted TB is segmented, or whether there are interrupted data among the earlier N received transmissions of a CBG scheduled by the downlink control channel to be retransmitted, or which Code Block (CB) has interruption within the earlier N received transmissions of CBs in a CBG scheduled by the downlink control channel to be retransmitted, or which symbol has interruption within symbols occupied by the number of times previous transmissions, of a CBG scheduled by the downlink control channel to be retransmitted, or which symbols among symbols occupied by the earlier N received transmissions of CBs in a CBG scheduled by the downlink control channel to be retransmitted.

9. The terminal according to claim 8, wherein the downlink control channel comprises a first indicating field, wherein the first indicating field indicates which Code Block Group (CBG), among segmented CBGs of an initially transmitted Transport Block (TB) is to be retransmitted in a shared channel scheduled by the downlink control channel;

wherein the first indicating field exists or is valid only in a downlink control channel scheduling retransmission; or the first indicating field exists or is valid when the terminal is configured to transmit data with CBGs; or the first indicating field exists or is valid in any downlink control channel.

10. The terminal according to claim 8, wherein the processor configured to determine whether the downlink control channel is a downlink control channel scheduling retransmission is configured:

to determine whether the downlink control channel is a downlink control channel scheduling retransmission according to a Downlink Control Information (DCI) format used for the downlink control channel; or to determine whether the downlink control channel is a downlink control channel scheduling retransmission according to a Radio Network Temporary Identity (RNTI) used for the downlink control channel; or to determine whether the downlink control channel is a downlink control channel scheduling retransmission according to a Hybrid Automatic Repeat reQuest (HARD) process number and a new data indicating field in the downlink control channel; or when the downlink control channel comprises a first indicating field indicating at least one CBG to be retransmitted, to determine that the downlink control channel schedules retransmission.

11. The terminal according to claim 8, wherein the processor is further configured:

when it is determined that there are interrupted data, to clear the interrupted data, or to replace the interrupted data with corresponding data in the retransmitted data packet.

12. A base station, comprising: a processor and a memory, wherein:

the processor is configured to read and execute program in the memory:

to transmit a downlink control channel to a terminal to schedule retransmission; and to notify the terminal using the downlink control channel about whether there are interrupted data among earlier N received transmissions of a retransmission data packet scheduled by the downlink control channel, wherein N is an integer more than or equal to 1;

wherein the processor is further configured to read and execute program in the memory to notify the terminal using the downlink control channel about whether there are interrupted data among the earlier N received transmissions of the retransmission data packet scheduled by the downlink control channel, in any one of the following approaches:

in a first approach, when the processor is further configured to transmit the downlink control channel before feeding back Acknowledgement/Non-Acknowledgement, ACK/NACK, information for the earlier N received transmissions of the retransmission data packet scheduled by the downlink control channel, the processor is further configured to notify the terminal that it is determined that there are interrupted data among the earlier N received transmissions of the retransmission data packet scheduled by the downlink control channel; wherein the processor is further configured, when the downlink control channel comprises a first indicating field, to notify the terminal that it is determined there are interrupted data among the earlier N received transmissions of a CBG scheduled by the first indicating field in the downlink control channel to be retransmitted;

in a second approach, the downlink control channel comprises a second indicating field, wherein the second indicating field comprises 1-bit indication information, or 1-bit indication information for each TB scheduled by the downlink control channel to be transmitted in the same shared channel, wherein the second indicating field indicates whether there are the earlier N received transmissions of the retransmission data packet scheduled by the downlink control channel interrupted data among the earlier N received transmissions of the retransmission data packet scheduled by the downlink control channel, wherein the second indicating field exists or is valid only in a downlink control channel scheduling retransmission; or the second indicating field exists or is valid when the terminal is configured to transmit data with CBGs; or the second indicating field exists or is valid in any downlink control channel;

wherein the processor is further configured, when the downlink control channel comprises a first indicating field, to notify the terminal that it is determined there are interrupted data among the earlier N received transmissions of a CBG scheduled by the first indicating field in the downlink control channel to be retransmitted;

in a third approach, the downlink control channel comprises a second indicating field, wherein the second indicating field comprises M-bit indication information for each TB of a plurality of TBs scheduled by the downlink control channel to be transmitted in the same shared channel, wherein 1-bit in the M-bit indication information corresponds to one of CBGs into which an initially transmitted TB is segmented, and indicates whether there are interrupted data among the earlier N received transmissions of the corresponding CBG, wherein M is an integer more than or equal to 1; wherein the second indicating field exists or is valid only in a downlink control channel scheduling retransmission; or the second indicating field exists or is valid when the terminal is configured to transmit data with CBGs; or the second indicating field exists or is valid in any downlink control channel; and in a fourth approach, the processor is further configured to transmit a shared channel scheduled by the downlink control channel, wherein the shared channel comprises a third indicating field, and the third indicating field indicates whether there are the earlier N received transmissions of the retransmission data packet scheduled by the downlink control channel interrupted data among the earlier N received transmissions of the retransmission data packet scheduled by the downlink control channel, wherein the third indicating field indicating whether there are interrupted data among the earlier N received transmissions of the retransmission data packet scheduled by the downlink control channel, comprises: the third indicating field indicating: whether there are interrupted data among the earlier N received transmissions of each CBG among CBGs into which an initially transmitted TB is segmented, or whether there are interrupted data among the earlier N received transmissions of a CBG scheduled by the downlink control channel to be retransmitted, or which Code Block (CB) has interruption within the earlier N received transmissions of CBs in a CBG scheduled by the downlink control channel to be retransmitted, or which symbol has interruption within symbols occupied by the number of times previous transmissions, of a CBG scheduled by the downlink control channel to be retransmitted, or which symbols among symbols occupied by the earlier N received transmissions of CBs in a CBG scheduled by the downlink control channel to be retransmitted.

13. The base station according to claim 12, wherein the downlink control channel comprises a first indicating field, wherein the first indicating field indicates which Code Block Group (CBG), among segmented CBGs of an initially transmitted Transport Block (TB), is to be retransmitted in a shared channel scheduled by the downlink control channel;

wherein the first indicating field exists or is valid only in a downlink control channel scheduling retransmission; or the first indicating field exists or is valid when the terminal is configured to transmit data with CBGs; or the first indicating field exists or is valid in any downlink control channel.

14. The base station according to claim 12, wherein the processor configured to determine whether the downlink control channel is a downlink control channel scheduling retransmission is configured:
  to determine whether the downlink control channel is a downlink control channel scheduling retransmission according to a Downlink Control Information (DCI) format used for the downlink control channel; or
  to determine whether the downlink control channel is a downlink control channel scheduling retransmission according to a Radio Network Temporary Identity (RNTI) used for the downlink control channel; or
  to determine whether the downlink control channel is a downlink control channel scheduling retransmission according to a Hybrid Automatic Repeat reQuest (HARD) process number and a new data indicating field in the downlink control channel; or
  when the downlink control channel comprises a first indicating field indicating at least one CBG to be retransmitted, to determine that the downlink control channel schedules retransmission.

15. The method according to claim 1, wherein when it is determined in the fourth approach that there are interrupted data among the earlier N received transmissions of the retransmission data packet scheduled by the downlink control channel,
  the third indicating field, and retransmitted information carried in the shared channel is encoded separately; and/or
  the third indicating field is transmitted over a resource corresponding to fixed CBG of CBGs carried in the shared channel, through puncturing or rate matching; and/or
  before the terminal obtains the third indicating field, the method further comprises:
  determining, by the terminal, whether the third indicating field exists, comprising:
  determining that the third indicating field exists, upon determining that the shared channel carries retransmission; or
  determining, by the terminal, whether the third indicating field exists based on a fourth indicating field of at least one bit in the downlink control channel, wherein the fourth indicating field indicates whether the third indicating field exists in the shared channel; and
  when the terminal determines that the third indicating field exists, determining whether the third indicating field comprises more bits of indication information, wherein:
  the third indicating field comprises at least one bit of indication information to indicate whether the third indicating field comprises more bits of indication information.

16. The method according to claim 5, wherein when it is determined in the fourth approach that there are interrupted data among the earlier N received transmissions of the retransmission data packet scheduled by the downlink control channel,
  the third indicating field, and retransmitted information carried in the shared channel is encoded separately; and/or
  the third indicating field is transmitted over a resource corresponding to fixed CBG of CBGs carried in the shared channel, through puncturing or rate matching; and/or
  before the base station generates the third indicating field, the method further comprises:
  determining, by the base station, whether the third indicating field exists, comprising:
  determining that the third indicating field exists, upon determining that the shared channel carries retransmission; or
  determining, by the terminal, whether the third indicating field exists based on a fourth indicating field of at least one bit in the downlink control channel, wherein the fourth indicating field indicates whether the third indicating field exists in the shared channel, determining, by the base station, whether the third indicating field exists, and notifying the terminal using the fourth indicating field; and
  when the base station determines that the third indicating field exists, determining whether the third indicating field comprises more bits of indication information, comprising:
  when the third indicating field comprises at least one bit of indication information to indicate whether the third indicating field comprises more bits of indication information, determining, by the base station, whether the third indicating field comprises more bits of indication information, and notifying the terminal using the 1-bit indication information.

17. The terminal according to claim 8, wherein when it is determined in the fourth approach that there are the earlier N received transmissions of the retransmission data packet scheduled by the downlink control channel interrupted data among the earlier N received transmissions of the retransmission data packet scheduled by the downlink control channel,
  the third indicating field, and retransmitted information carried in the shared channel is encoded separately; and/or
  the third indicating field is transmitted over a resource corresponding to fixed CBG of CBGs carried in the shared channel, through puncturing or rate matching; and/or
  the processor configured to determine whether the third indicating field exists is further configured:
  to determine that the third indicating field exists, upon determining that the shared channel carries retransmission; or
  to determine whether the third indicating field exists based on a fourth indicating field of at least one bit in the downlink control channel, wherein the fourth indicating field indicates whether the third indicating field exists in the shared channel; and
  when the terminal determines that the third indicating field exists, to determine whether the third indicating field comprises more bits of indication information, wherein:
  the third indicating field comprises at least one bit of indication information to indicate whether the third indicating field comprises more bits of indication information.

18. The base station according to claim 12, wherein when it is determined in the fourth approach that there are interrupted data among the earlier N received transmissions of the retransmission data packet scheduled by the downlink control channel,
  the third indicating field, and retransmitted information carried in the shared channel is encoded separately; and/or the third indicating field is transmitted over a resource corresponding to fixed CBG of the CBGs carried in the shared channel, through puncturing or rate matching; and/or the processor configured to determine that the third indicating field exists is further configured:

to determine that the third indicating field exists, upon determining that the shared channel carries retransmission; or to determine whether the third indicating field exists based on a fourth indicating field of at least one bit in the downlink control channel, wherein the fourth indicating field indicates whether the third indicating field exists in the shared channel, to determine whether the third indicating field exists, and to notify the terminal using the fourth indicating field; and when the processor determines that the third indicating field exists, the processor configured to determine whether the third indicating field comprises more bits of indication information is further configured:

when the third indicating field comprises at least one bit of indication information to indicate whether the third indicating field comprises more bits of indication information, to determine whether the third indicating field comprises more bits of indication information, and to notify the terminal using the 1-bit indication information.

* * * * *